(12) United States Patent
Sawada

(10) Patent No.: US 6,939,061 B2
(45) Date of Patent: Sep. 6, 2005

(54) TURNTABLE DEVICE AND OPTICAL APPARATUS

(75) Inventor: Toru Sawada, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/352,751

(22) Filed: Jan. 27, 2003

(65) Prior Publication Data

US 2003/0142973 A1 Jul. 31, 2003

(30) Foreign Application Priority Data

Jan. 31, 2002 (JP) ........................................ 2002-024135
Feb. 4, 2002 (JP) ........................................ 2002-027372
Feb. 15, 2002 (JP) ........................................ 2002-038964

(51) Int. Cl.$^7$ ............................................ G03B 17/00
(52) U.S. Cl. ........................ 396/427; 348/143; 348/373
(58) Field of Search ........................ 396/427; 348/143, 348/152, 373

(56) References Cited

U.S. PATENT DOCUMENTS 6,356,308 B1 * 3/2002 Hovanky ...................... 348/373
2003/0174239 A1 * 9/2003 Sawada ........................ 348/373

FOREIGN PATENT DOCUMENTS

JP          2001-157086          6/2001

* cited by examiner

Primary Examiner—David M. Gray
(74) Attorney, Agent, or Firm—Brinks Hofer Gilson & Lione

(57) ABSTRACT

A turntable device principally includes a horizontal rotation base and an up-and-down swinging mechanism, which are driven by VCMs. An optical apparatus is placed on supports, which are arranged on the horizontal rotation base, with a horizontal rotation shaft therebetween. The optical apparatus is directed up-and-down and right-and-left by movable pieces connected to movable coils of the VCMs, so as to constitute the turntable device. The optical apparatus is placed on the turntable.

8 Claims, 23 Drawing Sheets

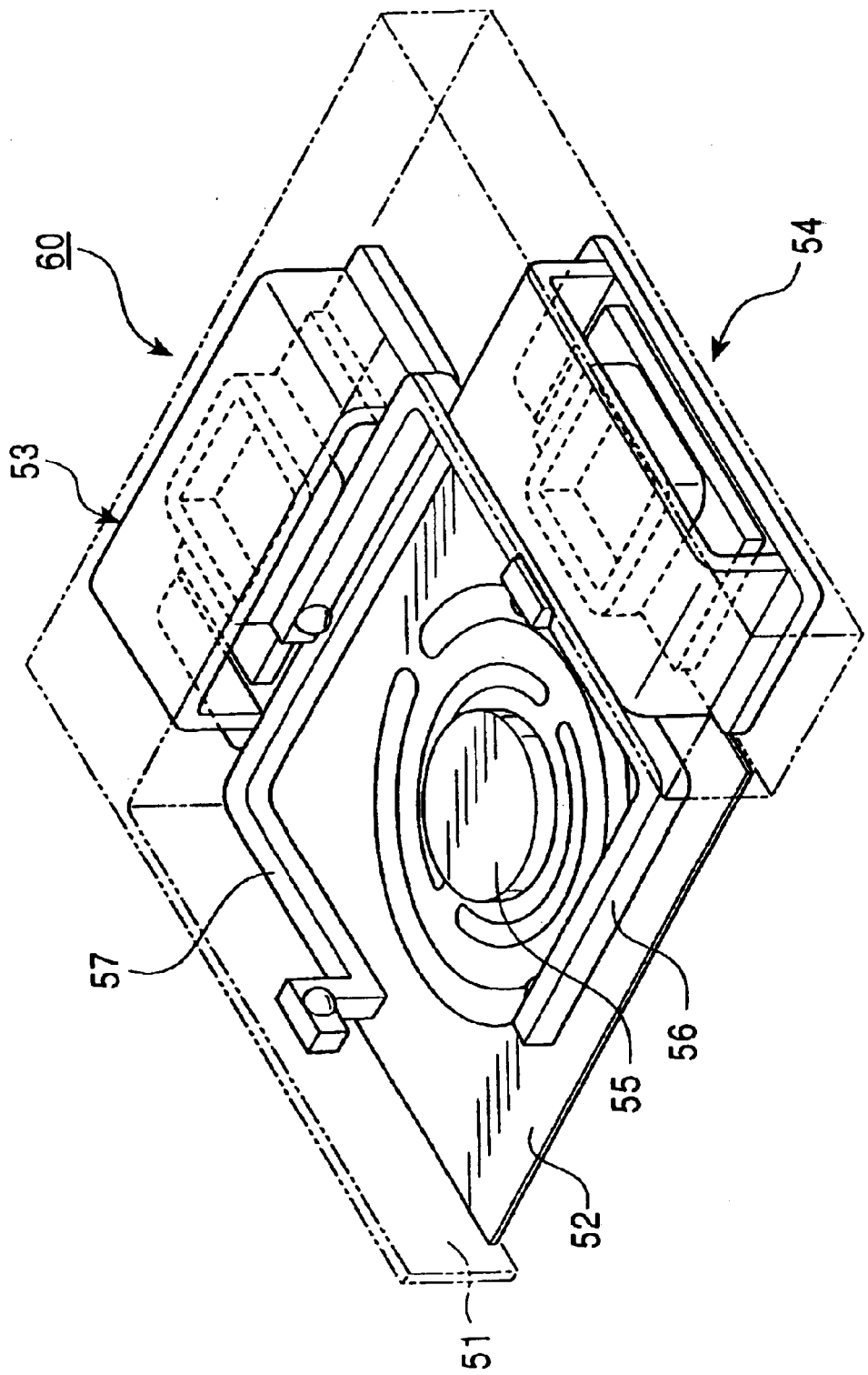

TURNTABLE DEVICE AND OPTICAL APPARATUS

BACKGROUND OF THE INVENTION

1. Field of the Invention

The present invention relates to a turntable device for changing a direction of an optical apparatus such as a camera and a lamp, and relates to an optical apparatus incorporating the turntable device thereinto.

2. Description of the Related Art

It is important that an optical apparatus such as a camera and a lamp decides a direction toward an object. In the camera, for example, by determining an optimum camera angle obtained from pointing the camera at the object in various directions, a well-composed picture can be obtained. Heretofore, as camera angle adjusting means, a manual turntable has been devised, and then a remote-controlled motor-driven turntable has been developed. Recently, surveillance TV cameras are frequently placed thereon for use in an indoor or outdoor surveillance system.

For example, a motor-driven camera turntable device shown in FIGS. 35 and 36 is known. FIG. 35 is an external view of a conventional camera turntable for a surveillance camera; FIG. 36 is a perspective view of the interior of the turntable for illustrating the rotating mechanism of the camera turntable. Referring to FIG. 35, a camera turntable 303 is attached on a horizontal turntable 305, and to the camera turntable 303, a video camera 302 is fixed with camera bases 304 therebetween. The horizontal turntable 305 has functions of rotating a camera direction on a horizontal plane by a horizontally rotating mechanism, which will be described later. The camera bases 304 are installed to the camera turntable 303 with an up-and-down swinging shaft 308 therebetween, and has functions of swinging the camera on a vertical plane by an up-and-down swinging mechanism, which will be described later. The camera can be directed in an arbitrary direction at every angle.

FIG. 36 is a perspective view of the rotating mechanism of the camera turntable 303 for illustrating the internal structure thereof. A horizontally rotational shaft 306 is an axis, about which the camera turntable 303 is rotated on a horizontal plane, and the shaft 306 is fixed to the horizontal turntable 305 with a bearing mechanism (not shown) therebetween. The horizontal turntable 305 is connected to a horizontally rotation motor 311 with a gear/rack mechanism (not shown) therebetween, so that the turntable 305 is rotated about the horizontally rotational shaft 306 by the horizontally rotation motor 311.

To the horizontal turntable 305, supports 307 are attached, which support an up-and-down swinging shaft 308. The up-and-down swinging shaft 308 is connected to an up-and-down swinging motor 312 with an up-and-down swinging fixture 313, which comprises a gear/rack mechanism, therebetween. The up-and-down swinging shaft 308 is also fixed to the camera bases 304, to which a video camera is fixed. By such a structure, the video camera is moved about the up-and-down swinging shaft 308 in up-and-down directions by the up-and-down swinging motor 312.

The above-described structure swings the video camera 302 in an arbitrary direction at every angle by the combination of the horizontally rotation motor 311 with the up-and-down swinging motor 312, so that the video camera 302 can be precisely directed toward an object. Thereby, it is assumed that the camera can be directed by remote control operation using electrical signals.

In addition, referring to FIG. 35, a camera case 301 is a protection case for protecting an outdoor-use camera from natural environment.

However, the following problems have been encountered in the camera turntable device described above. The reduction in size and weight is limited because of the mechanical structure such as a motor and gear/rack mechanism, and the mechanical backlash is not avoided so as to be difficult in obtaining micro angular changes and quick responsiveness, because the gear/rack mechanism is adopted in the rotation transmission. Furthermore, if the device is installed outdoors, rattle is produced in the gear/rack mechanism for the repeated stress due to wind, thereby reducing the mechanical endurance strength and producing noise.

SUMMARY OF THE INVENTION

It is an object of the present invention to provide a miniaturized turntable device capable of performing micro angular adjustment and rapid response with excellent mechanical endurance and without noise produced.

Also it is another object of the present invention to provide an optical apparatus placed on such a functionally excellent turntable device.

It is still another object of the present invention to provide a camera platform constructed using a voice coil motor capable of instantly moving and precisely performing angle adjustment, without using a conventional driving mechanism comprising a rotationally driving motor and a gear, and to provide an optical apparatus incorporating the camera platform and being capable of rapidly directing an optical instrument, such as a camera and a light, toward an object.

In order to solve the problems described above, a turntable device according to the present invention uses a VCM (voice coil motor) so as to direct an optical apparatus by utilizing the movement of a movable coil of the VCM.

A turntable device according to the present invention for changing a direction of an optical apparatus comprises a base; a horizontally rotatable table being rotatable right-and-left and disposed on the base; supports disposed on the horizontally rotatable table; an up-and-down swinging shaft to be connected to the optical apparatus through the supports for supporting the up-and-down swinging shaft; horizontally rotating means arranged on the base for rotating the horizontally rotatable table right-and-left so as to rotate the optical apparatus right-and-left; and up-and-down swinging means arranged on the horizontally rotatable table for swinging the optical apparatus up-and-down about the up-and-down swinging shaft, wherein the optical apparatus can be directed up-and-down and right-and-left.

Such a structure enables a turntable device to be miniaturized and to perform micro angular adjustment and rapid response with excellent mechanical endurance and without noise produced.

It is preferable to use a rare-earth permanent magnet containing neodymium for the VCM used in the turntable device according to the present invention.

The rare-earth permanent magnet containing neodymium has an extremely high maximum magnetic flux (BHmax), enabling a compact high-powered permanent magnet with excellent characteristics to be obtained, and thereby constructing a compact and high-performance VCM. Therefore, the turntable device can also be miniaturized, and moreover can be reduced in cost because the material is comparatively inexpensive.

Next, an optical apparatus according to the present invention has a turntable device according to the present invention.

According to the optical apparatus of the present invention, the turntable device can be miniaturized, so as to have a turntable device capable of performing micro angular adjustment and rapid response with excellent mechanical endurance and without noise produced.

An optical apparatus according to the present invention may comprise a positional detection sensor for detecting the displacement of the optical apparatus in addition to the turntable device of the present invention.

Furthermore, an optical apparatus according to the present invention may preferably comprise a driving circuit board for controlling a VCM.

Such a structure of the optical apparatus enables the displacement of the optical apparatus to be accurately detected, in which if the detected displacement is converted into an electrical signal so as to be fed back to a driving circuit for controlling the VCM, micro angular variations can be accurately detected enabling rapid response, so that the optical apparatus can be precisely directed in an arbitrary direction.

Furthermore, a camera-platform mechanism according to the present invention uses a gimbal spring and a VCM (voice coil motor), and the movement of a movable coil of the VCM is transmitted to an object to be mounted such as an optical apparatus placed on the gimbal spring via an arm so as to direct the object to be mounted.

That is, a camera-platform mechanism according to the present invention for changing a direction of an object to be mounted principally comprises a base; a gimbal spring, on which the object to be mounted is placed with the base therebetween; a VCM having a movable coil; and an arm connected to the movable coil of the VCM, wherein the object to be mounted is directed by pushing a side surface of the object to be mounted with the arm.

Such a structure enables a camera-platform mechanism to be miniaturized, especially reduced in thickness, and moreover to perform micro angular adjustment and rapid response with excellent mechanical endurance and without noise produced.

In the camera-platform mechanism according to the present invention, the camera-platform mechanism may preferably have two VCMs, and preferably, the movable coils of the VCMs are moved in directions perpendicular to each other. Also, the arm connected to the movable coil of the VCM may preferably push a side surface of the object to be mounted in a reversible direction.

The combination of movements in directions perpendicular to each other facilitates the object to swing at every angle.

Furthermore, it is preferable that the object to be mounted be pushed on a side surface at the same height with the arm connected to the movable coil of the VCM.

Pushing the object to be mounted at a position separated from the gimbal spring as far as possible facilitates the object to be inclined, and pushing the object on a side surface at the same height enables the object to be inclined about the gimbal spring as a rotational center at the same angle by the same intensity electric signal, so as to have advantages of easy control.

A rare-earth permanent magnet containing neodymium may be preferably used for the VCM according to the present invention.

The rare-earth permanent magnet containing neodymium has an extremely high maximum magnetic flux (BHmax), enabling a compact high-powered permanent magnet with excellent characteristics to be obtained, and thereby constructing a compact high-performance VCM. Therefore, the turntable device can also be miniaturized, and moreover can be reduced in cost because the material is comparatively inexpensive.

Next, an optical apparatus according to the present invention has a camera-platform mechanism according to the present invention.

The optical apparatus is not specifically limited, so that various apparatuses may be targeted, which are a camera such as an optical camera, TV camera, video camera, and digital camera; a lamp; a flash gun; and various optical measuring instruments.

The optical apparatus according to the present invention enables the camera-platform mechanism to be miniaturized, especially reduced in thickness, and moreover to perform micro angular adjustment and rapid response with excellent mechanical endurance and without noise produced.

The optical apparatus according to the present invention may further comprise a positional detection sensor for detecting the displacement of the optical apparatus in addition to the camera-platform mechanism according to the present invention.

The optical apparatus according to the present invention may preferably comprise a driving circuit board for driving the VCM.

Such a structure of the optical apparatus enables the displacement of the optical apparatus to be accurately detected, in which if the detected displacement is converted into an electrical signal so as to be fed back to a driving circuit for controlling the VCM, micro angular variations can be accurately detected enabling rapid response, so that the optical apparatus can be precisely directed in an arbitrary direction.

In order to solve the problems described above, a camera platform according to the present invention comprises a rotatable table; a holder member slidably disposed on the table; a movable base journaled on the table rotatably in a direction different from that of the table; a first driving unit for rotating the table in the circumferential direction of the table; a second driving unit for sliding the holder member; and rotation converting means for converting the sliding movement of the holder member into the rotational movement of the movable base, wherein a rotation shaft of the movable base is arranged outside the second driving unit.

By the rotation of the table, the movable base can be directed in the rotating direction of the table. By the rotation of the movable base in a direction different from the rotating direction of the table, the movable base can be directed in a direction different from above, so that the movable base can be directed in a targeted direction.

When the rotation shaft of the movable base is arranged outside the second driving unit, the rotational axis of the movable base can be arranged close to the movable base, and the rotational axis can be located in the vicinity of an instrument to be mounted on the movable base, so that the radius of the rotation of the instrument to be mounted on the movable base can be reduced, thereby miniaturizing the camera platform.

In order to solve the problems described above, in a camera platform according to the present invention, at least one of the first driving unit and the second driving unit may comprise a voice coil motor.

Using the voice coil motor as a mechanism for rotating the table enables the table to be rapidly rotated so as to rapidly direct the optical apparatus to a targeted direction without large noise. Also, using the voice coil motor as a mechanism for rotating the movable base enables the movable base to be rapidly rotated so as to rapidly direct the optical apparatus to a targeted direction without large noise.

In order to solve the problems described above, in a camera platform according to the present invention, the first driving unit may comprise a voice coil motor for rotation, and the voice coil motor may comprise a plurality of substantially annular yokes arranged in the periphery of a support shaft for rotatably supporting the table; a magnet member; and a coil member supported movably along one of the yokes in the circumferential direction of the yoke and also being connected to the table.

Using the voice coil motor having the coil member as a mechanism for rotating the table enables the table to be rapidly rotated following the movement of the coil member so as to rapidly direct the optical apparatus to a targeted direction without large noise.

In order to solve the problems described above, a camera platform according to the present invention may further comprise a yoke unit, which is constructed by concentrically arranging a substantially annular inner yoke, middle yoke, outer yoke, and a plurality of magnet members in the periphery of the support shaft, wherein the coil member may be arranged in the middle yoke so as to surround part of the middle yoke movably along the middle yoke in the circumferential direction of the middle yoke, so that the voice coil motor for rotation is constituted.

Since the coil member moving along the middle yoke in the circumferential direction of the middle yoke rotates the table, the voice coil motor can be operated for rotation, obtaining a driving structure capable of rapid moving and positioning with a high accuracy without large noise. Also, since the coil member is movable along the middle yoke, even when a rotational force such as human power is carelessly applied to the table, the table only runs idle and the mechanical load is not applied thereto, so that a load is difficult to be applied on the rotation mechanism of the table, thereby scarcely producing failure.

In order to solve the problems described above, in a camera platform according to the present invention, the second driving unit may comprise a linearly driving voice coil motor, and the voice coil motor may comprise a plurality of flat-plate yokes arranged on the table; a magnet member; and a coil member being movable back-and-force along one of the yokes in the longitudinal direction of the yoke.

In order to solve the problems described above, in a camera platform according to the present invention, the rotation converting means may comprise a guide board raised from the table and having an arc guide groove and a linear guide groove formed thereon, a holder member arranged slidably on the table along the linear guide groove of the guide board, and a movable base arranged slidably along the arc guide groove of the guide board by being pushed with the holder member.

Since the movable base is rotated along the arc guide groove of the guide board tracing an arc trajectory, the rotational axis of the movable base can be arranged close to the movable base, and the rotational axis can be located in the vicinity of an instrument to be mounted on the movable base, so that the radius of the rotation of the instrument to be mounted on the movable base can be reduced, thereby miniaturizing the camera platform. Also, since the sliding load of the movable base changes continuously, the movable base can be smoothly operated.

In order to solve the problems described above, in a camera platform according to the present invention, a pair of the guide boards opposing each other may be raised from the table; linear guide grooves are formed on the lower side of the opposing surfaces of the guide boards in parallel with the table; and arc guide grooves may be formed on the opposing surfaces of the guide boards above the linear guide grooves with the convex sides of the arc guide grooves facing the linear guide grooves, and wherein support pins protruded from both sides of the movable base may be inserted into the guide grooves so that the movable base is hung and supported by both the guide boards while the holder member, which pushes and moves the movable base, may be attached into the guide grooves.

The movable base sandwiched with the pair of guide boards is arranged, and the support pins provided on both sides of the movable base are inserted into the guide grooves of the guide boards, so that the movable base can be hung and supported to the pair of the guide boards, enabling the movable base to be moved along the guide grooves by the voice coil motor.

In order to solve the problems described above, in a camera platform according to the present invention, the bearings may be formed on the bottom of the slit formed in the upper center of the holder member, and the longitudinal direction of the slit may be perpendicular to that of the guide grooves, the slit allowing the guide pin to move in the perpendicular direction.

When the support pins move along the guide grooves of the guide boards so as to move the movable base, although the guide pin, which is not guided by the guide grooves, also moves tracing the movement trajectory of the movable base, the slit allows the guide pin to move in the longitudinal direction of the slit.

Therefore, the linear movement of the coil member in the voice coil motor for linear drive is transmitted to the movable base via the holder member, so that the movable base can move along the arc guide groove tracing an arc trajectory. Thereby, the optical instrument provided on the movable base can be securely inclined and moved tracing an arc trajectory.

An optical apparatus according to the present invention has an optical instrument mounted on the movable base of the camera platform having any one of structures described above, so that the optical instrument can be directed to a target. In this case, the rotational volume captured by the optical instrument can be reduced as small as possible, resulting in miniaturization of the apparatus.

According to a turntable device of the present invention, the turntable device can be rapidly miniaturized.

Also, rapid response and fine movement can be secured. Furthermore, a compact and high-performance turntable being strong against a force applied from the outside with reduced operating noise can be obtained.

Since an optical apparatus according to the present invention adopts a turntable device of the present invention, it has advantages of rapid direction setting and fine operational movement.

The optical apparatus according to the present invention exercises its power not only on a large optical apparatus such as a video camera but also on a small optical apparatus such as a mobile phone, compact camera being incorporated in a notebook personal computer, medical ultra-compact camera, or ultra-compact lamp using an LED.

Also, according to the present invention, by rotating the table with the first driving unit, the optical instrument can be directed in the rotating direction of the table. By rotating the movable base with the second driving unit, the optical instrument can be directed in a direction different from above, so that the optical instrument can be directed to a target.

Moreover, if the voice coil motor for rotation is provided, the table can be rapidly rotated, so that the optical instrument can be rapidly directed to a target, while the optical instrument can be rotated with small operational noise.

Also, if the voice coil motor for linear driving is used as a mechanism for up-and-down swinging the movable base for mounting the optical instrument thereon, the movable base can be rapidly moved so as to have advantages of rapidly moving the optical instrument without noise and positioning with a high accuracy.

When the movable base moves along the arc guide groove, the optical instrument mounted on the movable base can be moved along the guide groove tracing a circular-arc trajectory, so that the rotational axis can be located in the outside, enabling the optical instrument to be rotated with the minimum captured volume.

According to the present invention, the coil member moving along the middle yoke in the circumferential direction of the middle yoke rotates the table, so that the voice coil motor can be operated for rotation, thereby obtaining a tranquil driving mechanism capable of rapid moving and high-accuracy positioning without gear noise. Also, since the coil member is movable along the middle yoke, even when a rotational load is abruptly applied manually to the table, the table only runs idle and the mechanical load cannot be applied thereto, preventing the rotation mechanism of the table from being damaged.

According to the present invention, the movable base sandwiched with the pair of guide boards is arranged, and the support pins provided on both sides of the movable base are inserted into the guide grooves of the guide boards, so that the movable base can be hung and supported to the pair of the guide boards, enabling the movable base to be moved along the guide grooves by the voice coil motor.

Furthermore, when the movable base is pushed and moved by the holder member moving along the linear guide groove of the guide board, the movable base, which is hung and supported to both the guide boards, can be securely pushed and moved by the holder member. Following this, the movable base can be securely moved along the arc guide grooves of the guide boards, so that the optical instrument can be precisely and rapidly inclined at an arbitrary angle.

BRIEF DESCRIPTION OF THE DRAWINGS

FIG. 6 is an external perspective view of a camera platform mechanism according to a third embodiment of the present invention;

DESCRIPTION OF THE PREFERRED EMBODIMENTS

Embodiments according to the present invention will be described in detail below with reference to the drawings.

(First Embodiment)

Figure 1:
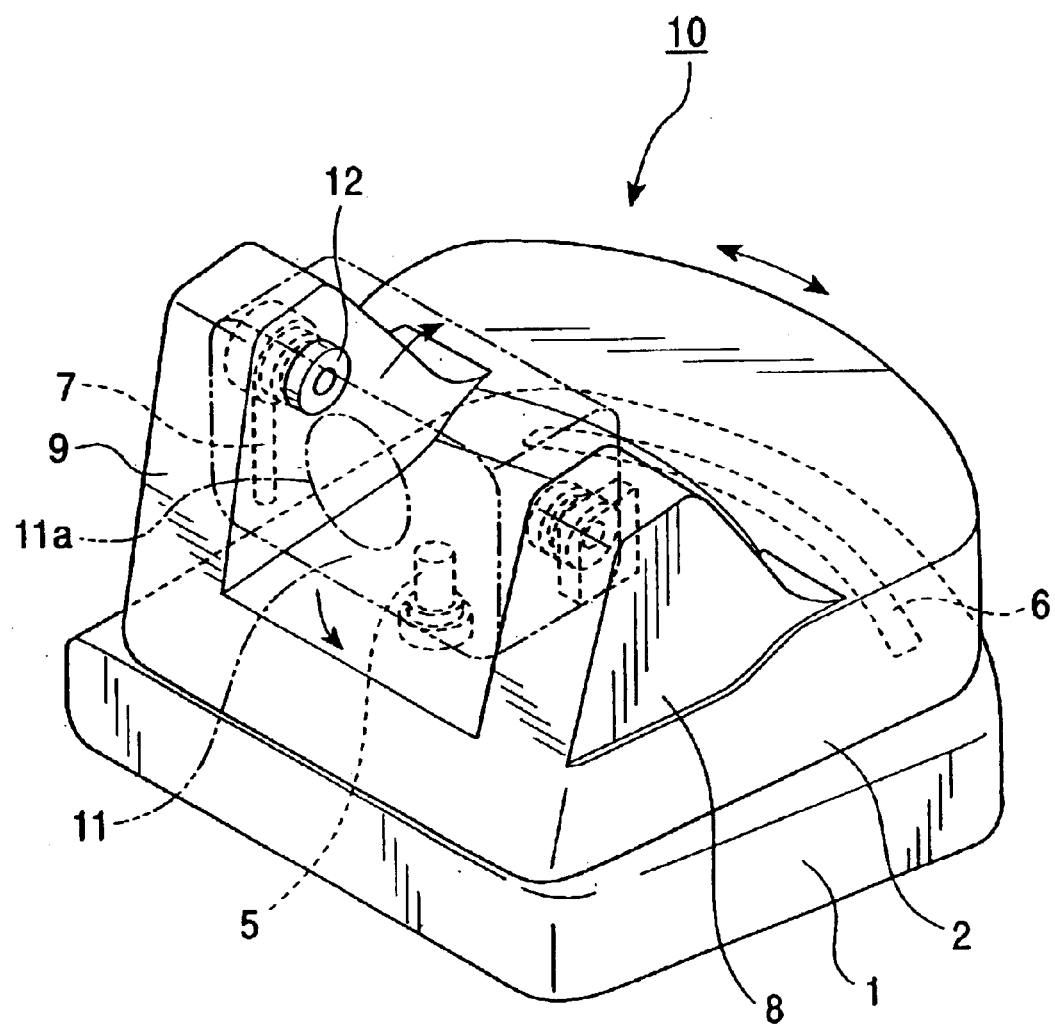
FIG. 1 is an external perspective view of a turntable device according to an embodiment of the present invention.

FIG. 1 is an external perspective view of a turntable device 10 for changing a direction of an optical apparatus according to an embodiment of the present invention. Referring to FIG. 1, a base 1 is a thin box accommodating horizontally swinging means 3, which will be described in detail later, therewithin. On the base 1, a horizontal rotation base 2 is placed, which is rotatable about a horizontal rotation shaft 5 in the right-and-left and on a guide rail 6 arranged on the base 1.

On the horizontal rotation base 2, two supports 8 and 9 are erected in parallel with each other, and an optical apparatus 11 is supported to the supports 8 and 9 with an up-and-down swinging shaft 12 therebetween. In the drawing, numeral 11a denotes a lens of the optical apparatus.

Furthermore, at one end of the up-and-down swinging shaft 12, an arm 7 is attached perpendicularly to the up-and-down swinging shaft 12, and is connected to up-and-down swinging means 4, which will be described later, arranged inside the horizontal rotation base 2.

Figure 2A:
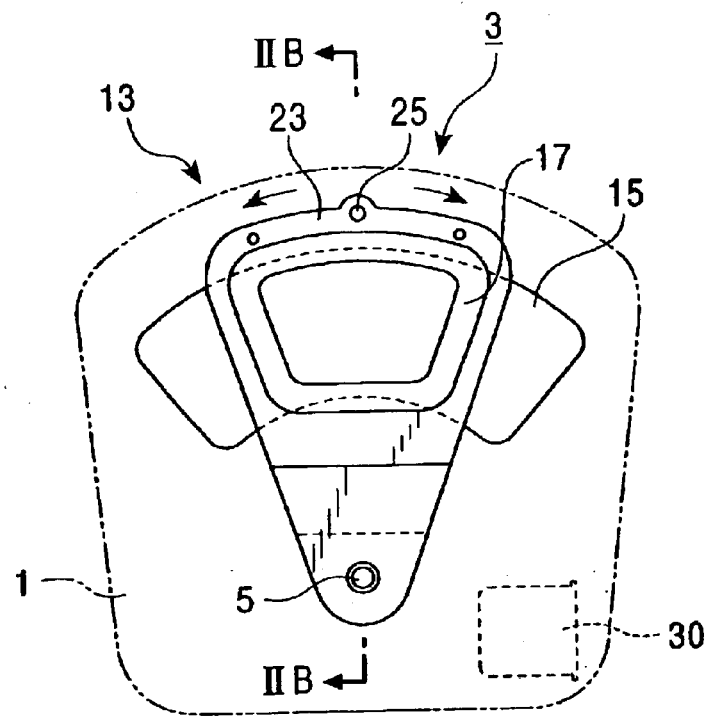
FIGS. 2A to 2C are drawings for illustrating horizontal rotating means of the turntable device shown in FIG. 1.
Figure 2B:
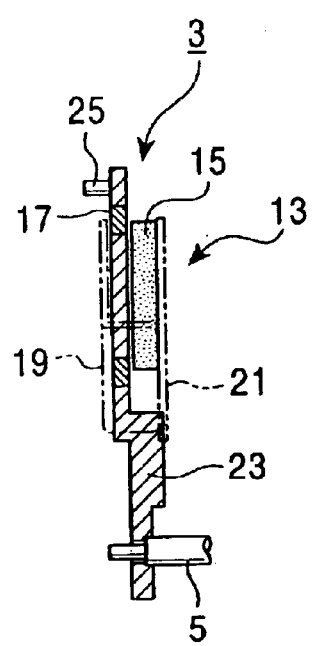
Figure 2C:
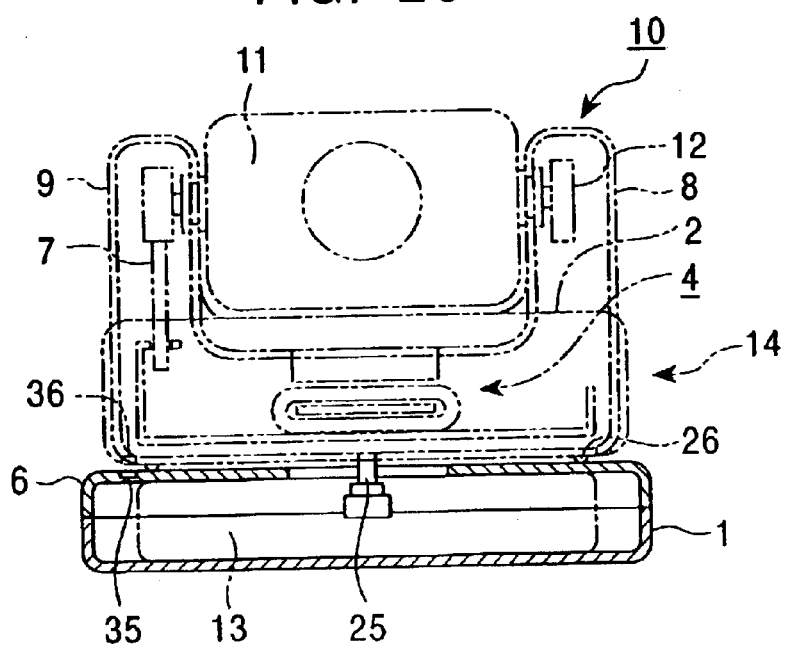

FIGS. 2A to 2C are schematic representations for illustrating the rotation mechanism of the horizontally swinging means 3 of the turntable device 10 shown in FIG. 1: FIG. 2A is a perspective plan view thereof; FIG. 2B is a sectional view at the line IIB—IIB of FIG. 2A; and FIG. 2C is a front view of the turntable device shown in FIG. 2A, in which the exterior of the base 1 is indicated by solid lines and the up-and-down swinging means 4 disposed on the base 1 is indicated by chain lines. As shown in the drawings, the horizontally swinging means 3 using a swinging VCM (voice coil motor) 13 is arranged within the base 1, and the up-and-down swinging means 4 using a direct-acting VCM 14 is arranged within the horizontal rotation base 2.

As shown in FIGS. 2A and 2B, in the horizontally swinging means 3 of the turntable device 10 according to the present invention, on the base 1, a sectorial permanent magnet 15 is fixed with a lower yoke 21 made of a soft magnetic material therebetween. Under the roof of the base 1, an upper yoke 19 made of a soft magnetic material is fixed so as to overlap the lower yoke 21. The permanent magnet 15 and the upper yoke 19 are spaced at a small interval, and a movable piece 23 connected to a sectorial movable coil 17 is arranged therebetween, so as to form a so-called VCM (voice coil motor). Since the sectorial movable coil 17 moves along the same sectorial permanent magnet 15, this VCM forms a so-called swinging VCM.

The swinging VCM 13 comprising the permanent magnet 15 and the movable coil 17, which is arranged so as to overlap the permanent magnet 15, is constructed so that the movable coil 17 swings along the permanent magnet 15 by a force applied from the permanent magnet 15, which is produced when a direct current flows through the movable coil 17.

The movable piece 23, which is integrally joined to the movable coil 17, moves integrally with the movable coil 17. Since the movable piece 23 is swingablly attached to the base 1 through the horizontal rotation shaft 5, the movable piece 23 swings in the right and left about the horizontal rotation shaft 5 as a rotational center.

Furthermore, the movable piece 23 is provided with a pin 25 erected at a position opposing the horizontal rotation shaft 5, and the pin 25, as shown in FIG. 2C, is fitted into the horizontal rotation base 2 placed on the base 1. The horizontal rotation base 2 having rollers 26 attached on the bottom surface thereof is rotatable along the guide rail 6 placed on the top surface of the base 1, so that if the movable piece 23 moves, the horizontal rotation base 2 also rotates back and forth about the horizontal rotation shaft 5 as the rotational center on the base 1.

By such a structure, the horizontal rotation base 2 rotates back and forth following the movement of the swinging VCM 13, thereby swinging the optical apparatus 11 back and forth.

In order to improve magnetic intensity, the permanent magnet 15 of the swinging VCM 13 is sandwiched by between the upper and lower yokes 19 and 21 made of a soft magnetic material.

Figure 3B:
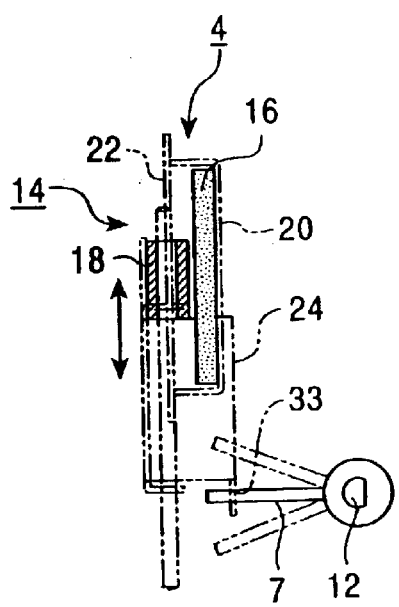
FIGS. 3A to 3C are drawings for illustrating up-and-down swinging means of the turntable device shown in FIG. 1.
Figure 3A:
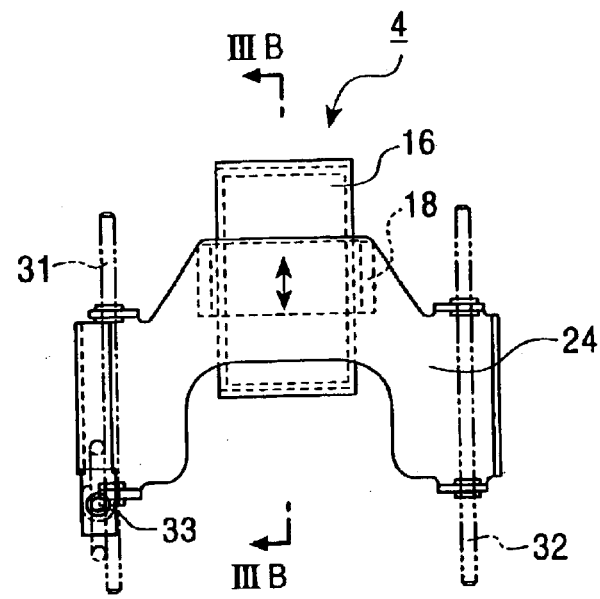
Figure 3C:
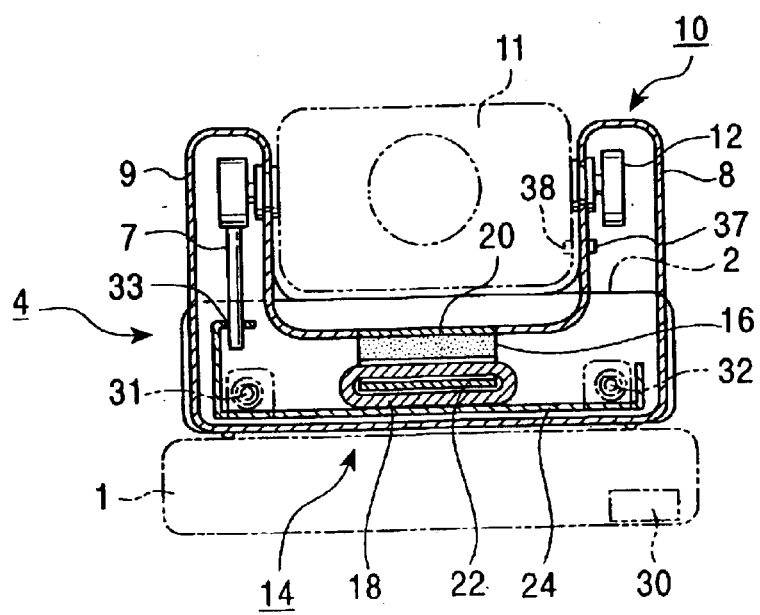

Next, FIGS. 3A to 3C show the structure of the up-and-down swinging means 4 of the turntable device 10: FIG. 3A is a plan view of the up-and-down swinging means 4; FIG. 3B is a sectional view at the line IIIB—IIIB of FIG. 3A; and FIG. 3C is a front view of the up-and-down swinging means 4, in which the exterior of the base 1 and the optical apparatus 11 are indicated by chain lines and the up-and-down swinging means 4 on the base 1 is indicated by solid lines. As shown in FIG. 3C, the up-and-down swinging means 4 is accommodated within the horizontal rotation base 2. As shown in FIGS. 3A and 3C, the up-and-down swinging means 4 is provide with a movable piece 24 stretching over between two parallel slide guides 31 and 32, which are fixed to the horizontal rotation base 2. To the movable piece 24, a movable VCM coil 18 is joined.

Under the roof surface of the horizontal rotation base 2, a permanent magnet 16 is fixed with an upper yoke 20 therebetween in parallel with the slide guides 31 and 32 and in the middle of the slide guides 31 and 32. The movable coil 18 is arranged in parallel with the permanent magnet 16 in a pile so as to be able to linearly move in parallel with the permanent magnet 16. Furthermore, a lower yoke 22 made of a soft magnetic material is arranged so as to penetrate the center of the movable coil 18 and to oppose the permanent magnet 16.

In such a manner, the permanent magnet 16, the movable coil 18, the upper yoke 20, and the lower yoke 22 constitute a direct-acting VCM 14.

The upper yoke 20 and the lower yoke 22 are for improving magnetic intensity.

Furthermore, as shown in FIGS. 3B and 3C, at one end of the movable piece 24, a hole 33 is formed, into which the arm 7 perpendicularly extending from the up-and-down swinging shaft 12 is inserted. Therefore, as shown in FIG. 3B, if the movable piece 24 linearly moves, the up-and-down swinging shaft 12 rotates via the arm 7. Following this, the optical apparatus 11 joined to the up-and-down swinging shaft 12 also swings up and down about the up-and-down swinging shaft 12.

As described above, the turntable device 10 according to the present invention can direct the optical apparatus 11 in an arbitrary direction at every angle by means of two units of the swinging VCM 13 and the direct-acting VCM 14.

The structure of the turntable device formed in such a manner can miniaturize the turntable device, and moreover it enables the turntable device to perform micro angular adjustment and rapid response with excellent mechanical endurance and without noise produced.

As a permanent magnet used in the turntable device according to the present invention, no specific limit is made; however, it is preferable to use a rare-earth permanent magnet containing neodymium (Nd).

The rare-earth permanent magnet containing neodymium having a composition of $Nd_7Fe_{14}B_2$ is a high-powered permanent magnet with excellent characteristics, in which a maximum magnetic flux (BHmax) reaches an extent of 40 MGOe. Therefore, if the VCM is constructed using the rare-earth permanent magnet containing neodymium, the VCM can be readily miniaturized. Moreover, a high-performance VCM is thereby obtained, which is sensitive even to a faint electric current.

Therefore, the turntable device can also be miniaturized, and moreover can be reduced in cost because the material is comparatively inexpensive.

The optical apparatus according to the present invention has the turntable device described above. In order to direct the optical apparatus incorporating such a turntable device to a target, electrostatic capacitive position sensors 35, 36, 37, and 38 shown in FIGS. 2C and 3C may be used. That is, as shown in FIG. 2C, the position sensors 35 and 36 comprising metallic-plate electrostatic capacitive electrodes are arranged to face each other at positions opposing each other of on the top surface of the base 1 and on the horizontal rotation base 2, so that a variation in the capacitance between the electrostatic capacitive electrodes due to the displacement of the horizontal rotation base 2 is detected to have the displacement of the horizontal rotation base 2.

Similarly, as shown in FIG. 3C, the position sensors 37 and 38 comprising metallic-plate electrostatic capacitive electrodes are arranged to face each other at positions opposing each other of in the support 8 and on the sidewall of the optical apparatus 11, so that a variation in the capacitance between the electrostatic capacitive electrodes due to the displacement of the optical apparatus 11 is detected to have the displacement of the optical apparatus 11.

These variations are converted into electrical signals and are fed back to a control circuit of a driving circuit board 30 arranged within the base 1 so as to drive the swinging VCM 13 and the direct-acting VCM 14, so that the optical apparatus 11 is directed to a target. The control circuit in the driving circuit board 30 using ICs is also miniaturized and is offered in high-performance, enabling a precise and accurate direction to be established.

(Second Embodiment)

Figure 4:
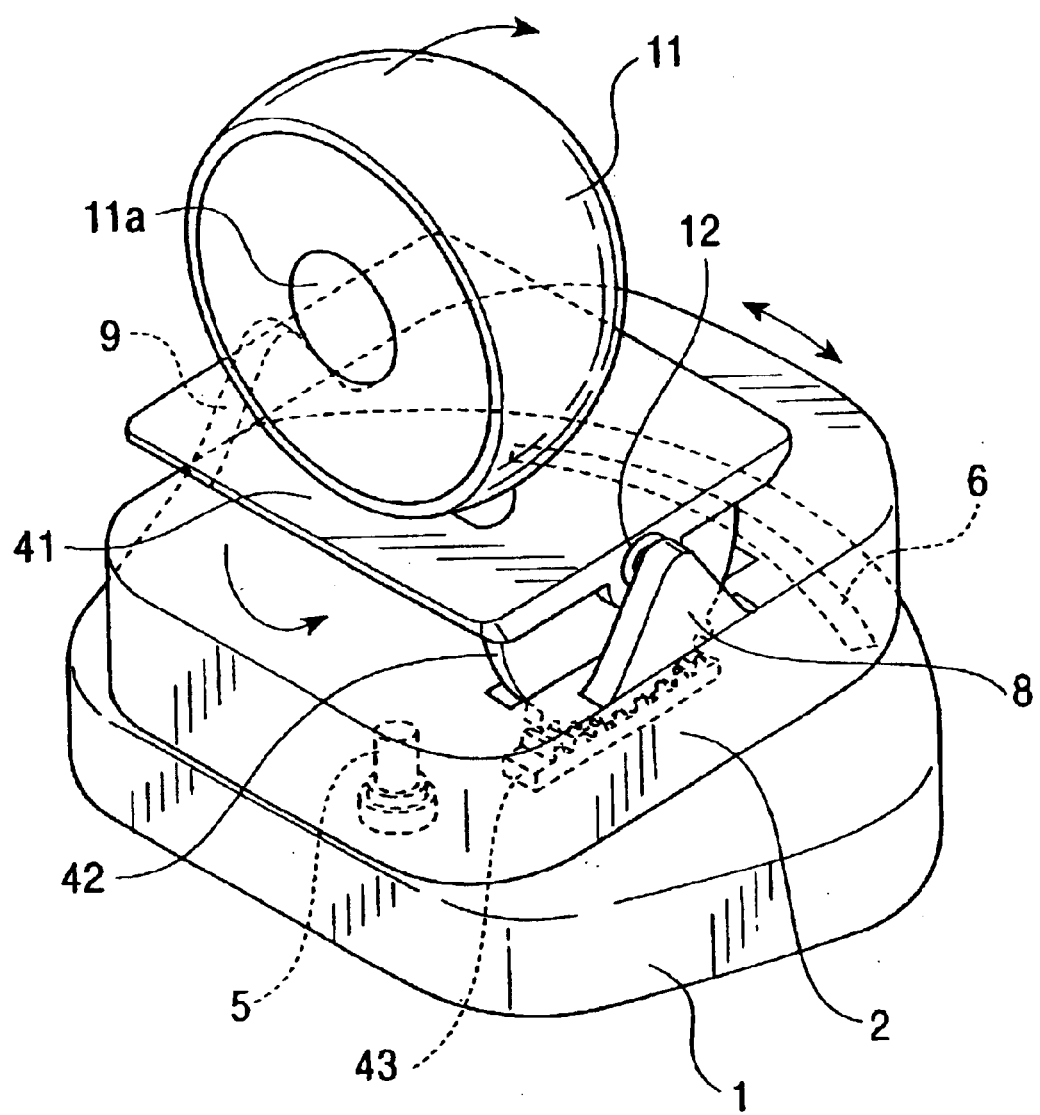
FIG. 4 is an external perspective view of a turntable device according to a second embodiment of the present invention.

FIG. 4 is an external perspective view of a turntable device according to another embodiment of the present invention for changing a direction of an optical apparatus. The point of a second embodiment different from the first embodiment is up-and-down swinging means for swinging the optical apparatus up-and-down. The mechanism for rotating the optical apparatus in the right and left is the same as that of the first embodiment. Accordingly, only a mechanism for swinging the optical apparatus up-and-down will be described.

Referring to FIG. 4, the optical apparatus 11 is fixed to an up-and-down rotation shaft 12 stretched between the two supports 8 and 9. On the bottom surface of an up-and-down rotation base 41, a semi-circular rotation gear 42 is attached so as to bring the center thereof together with the up-and-down rotation shaft 12. The rotation gear 42 is fitted to a rack plate 43 embedded within the horizontal rotation base 2. Since the rack plate 43 is connected to a movable coil of the direct-acting VCM embedded within the horizontal rotation base 2, the rotation gear 42 is rotated about the up-and-down rotation shaft 12 following the movement of the movable coil of the direct-acting VCM, enabling the optical apparatus 11 to swing up-and-down.

Next, the up-and-down swinging means according to the second embodiment will be described in detail with reference to FIGS. 5A to 5C.

Figure 5A:
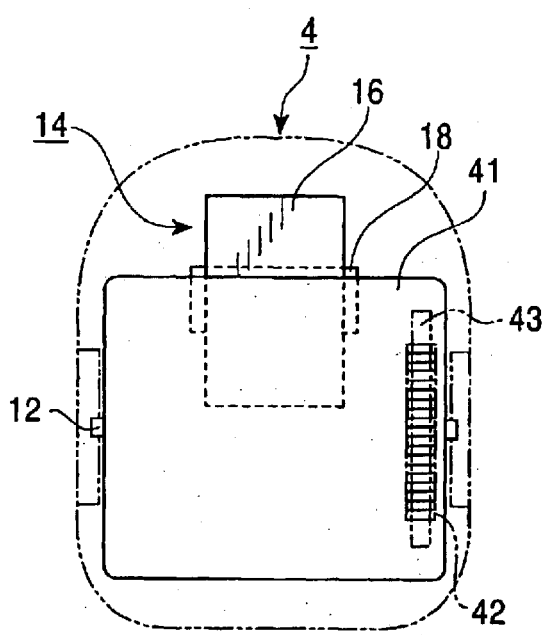
FIGS. 5A to 5C are drawings for illustrating up-and-down swinging means of the turntable device shown in FIG. 4.

FIG. 5A is a plan view of the up-and-down swinging means according to the second embodiment; FIG. 5B is a side view thereof; and FIG. 5C is a front view thereof.

As shown in FIG. 5A, the permanent magnet 16 of the direct-acting VCM is arranged on the center line of the up-and-down rotation base 41, and the movable coil 18 of the direct-acting VCM is arranged so as to overlap the permanent magnet 16. At one end of the up-and-down rotation base 41, the rotation gear 42 is arranged.

Figure 5B:
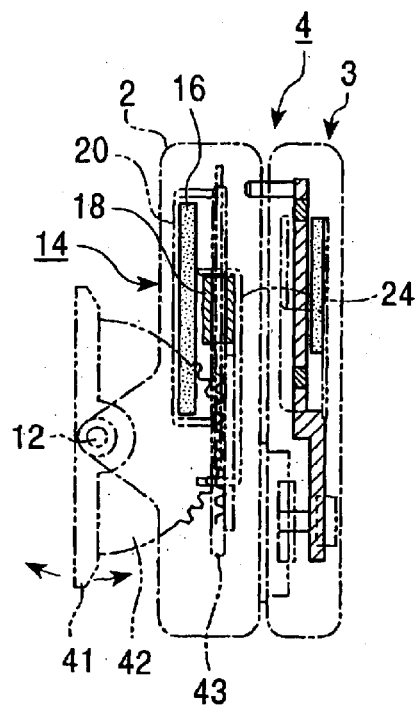

As shown in FIG. 5B, the rotation gear 42 joined to the up-and-down rotation base 41 is fitted to the rack plate 43. The rack plate 43 is joined to the movable coil 18 of the direct-acting VCM with the movable piece 24 therebetween.

Figure 5C:
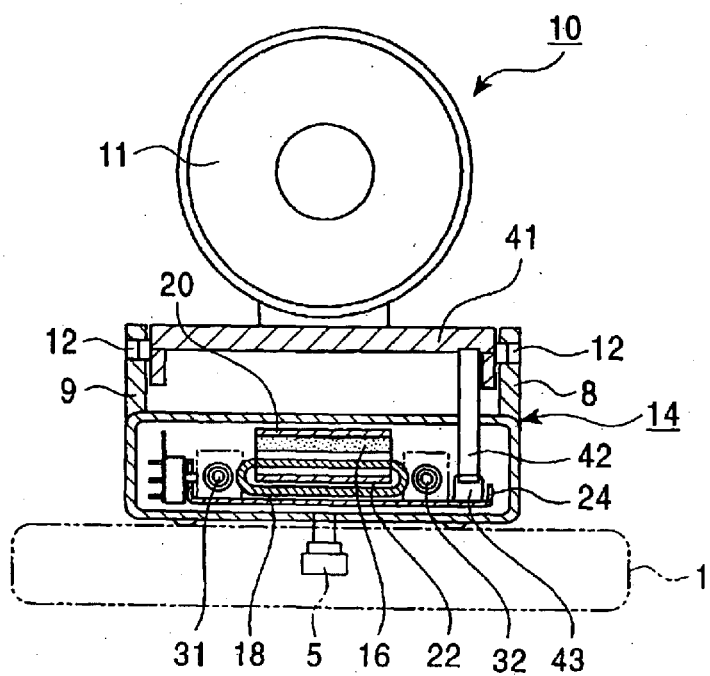

As shown in FIG. 5C, under the roof of the horizontal rotation base 2, the permanent magnet 16 is fixed with the upper yoke 20 therebetween. Underneath the permanent magnet 16, the movable coil 18 joined to the movable piece 24 is arranged. Into the center section of the movable coil 18, the lower yoke 22 is inserted. The movable coil 18 linearly moves along the permanent magnet 16 by a force applied from the permanent magnet 16, which is produced when an electric current flows through the movable coil 18.

In such a manner, the permanent magnet 16, the movable coil 18, the upper yoke 20, and the lower yoke 22 constitute the direct-acting VCM 14.

The upper yoke 20 and the lower yoke 22 are for improving magnetic intensity.

As described above, the turntable device 10 according to the embodiment can direct the optical apparatus 11 in an arbitrary direction up-and-down at every angle by means of the direct-acting VCM 14.

Furthermore, the optical apparatus 11 can be directed in an arbitrary direction at every angle by means of two VCMs of the swinging VCM 13 and the direct-acting VCM 14.

The horizontally swinging means and the detection method of the displacement of the optical apparatus 11 are the same as those in the first embodiment.

The structure of the turntable device formed in such a manner can miniaturize the turntable device, and moreover it enables the turntable device to perform micro angular adjustment and rapid response with excellent mechanical endurance and without noise produced.

(Third Embodiment)

FIG. 6 is an external perspective view of a camera-platform mechanism 60 according to the present invention for changing a direction of an object to be mounted such as an optical apparatus. Referring to FIG. 6, a horseshoe frame 51 has a gimbal spring 52 made of a thin metallic plate attached on the horseshoe section thereof. The horseshoe frame 51 is provided with VCMs 53 and 54 respectively placed in two sides of the frame. In the center of the gimbal spring 52, a pedestal base 55 is attached for placing an optical apparatus. To movable coils of the VCMs 53 and 54, which will be described in detail later, arms 56 and 57 are attached. Each end of the arms 56 and 57 is forked to have a horseshoe shape extending in the direction of the horseshoe frame 51 so as to surround the gimbal spring 52 from the direction perpendicular to each other. The object to be mounted (not shown in FIG. 6) is to be pushed by the arms 56 and 57.

Figure 7:
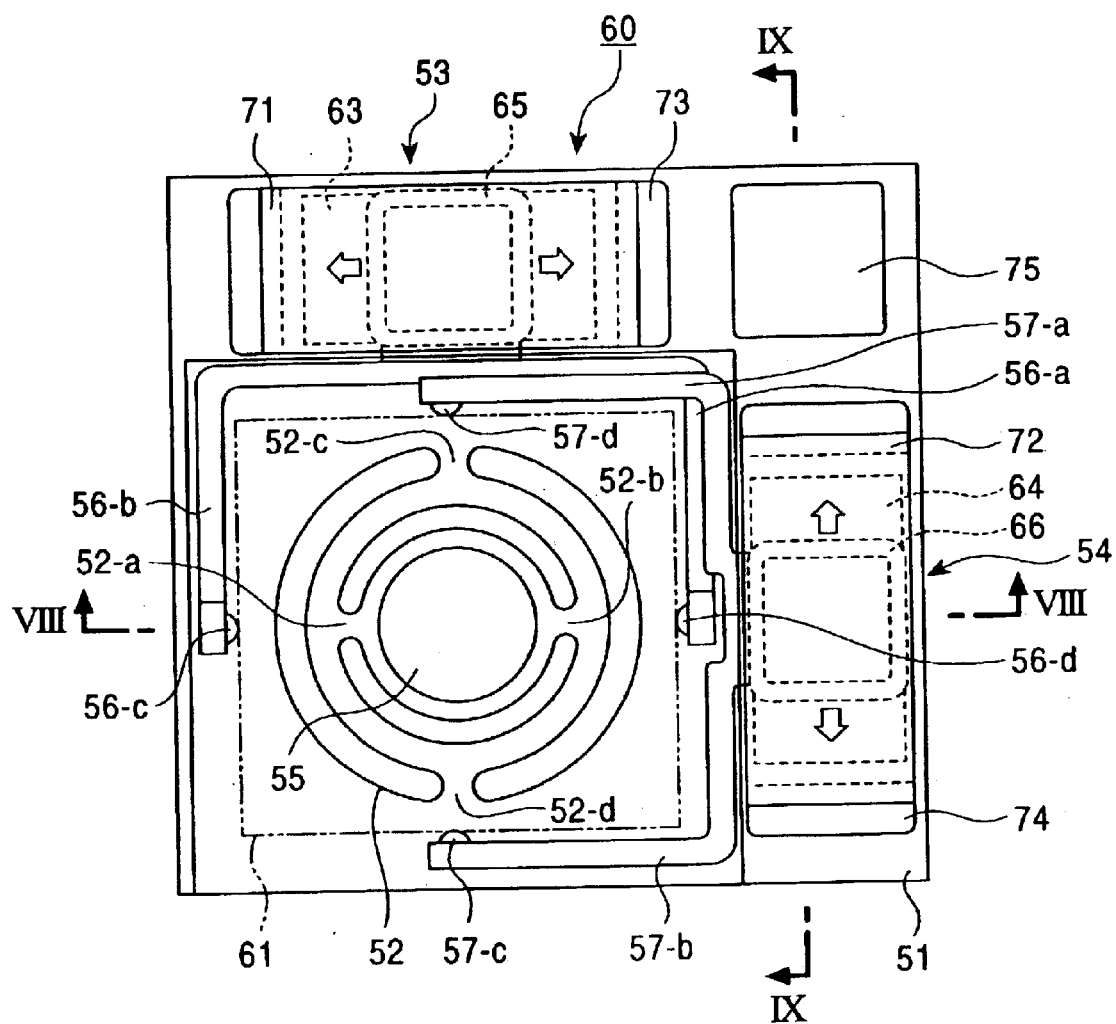
FIG. 7 is a perspective plan view of the camera platform mechanism shown in FIG. 6.

FIG. 7 is a perspective plan view of the camera-platform mechanism 60 shown in FIG. 6. As shown in the drawing, the gimbal spring 52 is attached in the lower-left of the pedestal base 51 on the plane of the figure, and the VCMs 53 and 54 are respectively arranged upward and in the right of the gimbal spring 52 on the plane of the figure. In the center of the gimbal spring 52, the pedestal base 55 is attached for placing an optical apparatus. On the pedestal base 55 of the gimbal spring 52, an optical apparatus 61, which is shown by broken lines, is placed as an example of an object to be mounted. Up-and-down and in the right and left of the optical apparatus 61 on the plane of the figure, edge projections 56-c, 56-d, 57-c, and 57-dof the arms 56-a, 56-b, 57-a, and 57-b, which are joined to the VCMs 53 and 54, are arranged in contact with the optical apparatus 61, respectively.

The VCMs 53 and 54 comprise permanent magnets 63 and 64 and movable coils 65 and 66, respectively. If direct currents flow through the movable coils 65 and 66, the movable coils 65 and 66 are to move in parallel with the permanent magnets 63 and 64, respectively. When the movable coils 65 and 66 move in parallel with the permanent magnets 63 and 64, the optical apparatus 61 is pushed from side faces via the arms 56 and 57 joined to the movable coils, respectively.

When the optical apparatus 61 is pushed from side faces, the optical apparatus 61 is rotated and inclined about torsion portions 52-a and 52-b of the gimbal spring 52 or torsion portions 52-c and 52-d thereof as fulcrums. Using the two VCMs 53 and 54 so as to incline the optical apparatus 61 up-and-down and in the right and left on the plane of the figure enables the optical apparatus 61 to be directed at an arbitrary direction (direction perpendicular to the plane of the figure).

Although the directional angle set by such a camera-platform mechanism is not so large, it is enough to fine adjust the direction.

In order to improve magnetic intensity, the permanent magnets 63 and 64 of the VCMs 53 and 54 are sandwiched by between the upper yokes 71 and 72 and lower yokes 73 and 74, which are made of a soft magnetic material, respectively. Also, in order to control the inclination of the optical apparatus 61, a driving circuit board 75 is arranged in the upper left of the plane of the figure for driving the VCMs 53 and 54.

Figure 8:
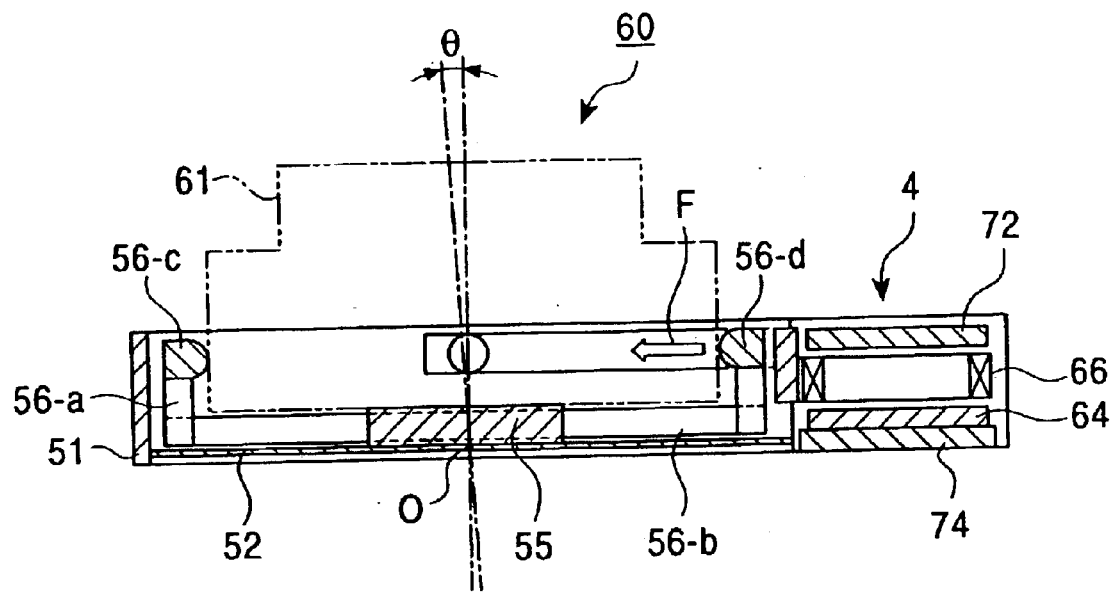
FIG. 8 is a perspective sectional view of the camera platform mechanism at the line XIII—XIII of FIG. 7.

FIG. 8 is a perspective sectional view of the camera-platform mechanism at the line VIII—VIII of FIG. 7. On the bottom of the pedestal base 51, the gimbal spring 52 is attached, and in the center of the gimbal spring 52, the optical apparatus 61 is placed with the pedestal base 51 therebetween. FIG. 8 shows the case where the optical apparatus 61 is pushed in the left on the plane of the figure by activating the VCM 53 shown in FIG. 7. The arms 56-a and 56-b connected to the movable coil 65 of the VCM 53 are moved in the left on the plane of the figure, and the projection 56-d at the edge of the arm 56-b abuts and pushes the side face of the optical apparatus 61 by a force F, so as to incline the optical apparatus 61 by an angle of θ in the left on the plane of the figure using the center O of the gimbal spring 52 as a fulcrum. When the arms 56-a and 56-b connected to the movable coil 65 move in the right on the plane of the figure, the projection 56-c abuts and pushes the side face of the optical apparatus 61, so as to incline the optical apparatus 61 in the right on the plane of the figure using the center O of the gimbal spring 52 as a fulcrum.

The right end portion of FIG. 8 is a section of the VCM 54, in which on the lower yoke 74, the permanent magnet 64 is arranged, further the upper yoke 72 is arranged at the top, and the movable coil 66 is arranged between the permanent magnet 64 and the upper yoke 72. The movable coil 66 is configured to be freely slidable perpendicularly to the plane of the figure, following an electric current flowing through the coil. In addition, a mechanism for sliding and supporting the movable coil 66 and the arm 56 is not shown.

In the drawing, the arm 57 is for pushing the optical apparatus 61 perpendicularly to the arm 56, and the operation method therefor is the same as that of the arm 56, so that the detailed description is omitted.

Figure 9:
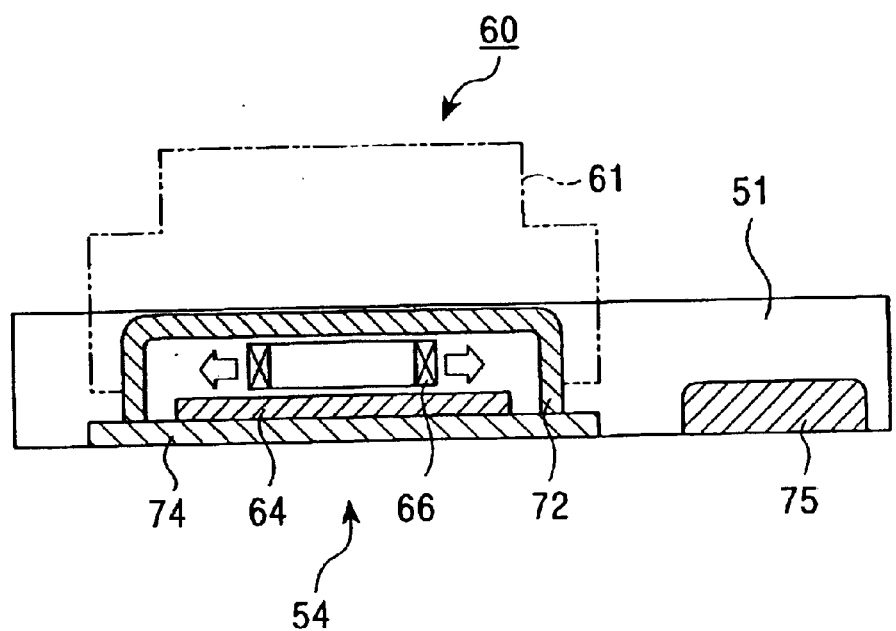
FIG. 9 is a perspective sectional view of the camera platform mechanism at the line XIIII—XIIII of FIG. 7.

FIG. 9 is a perspective sectional view of the camera-platform mechanism at the line VIIII—VIIII of FIG. 7 so as to simply show the moving direction of the movable coil 66 of the VCM 54. As shown in the drawing, undermost the pedestal base 51, the lower yoke 74 is arranged, on which the permanent magnet 64 is arranged. Furthermore, the upper yoke 74 hangs over so as to straddle the permanent magnet 64, and the movable coil 66 is arranged in the space between the permanent magnet 64 and the upper yoke 72. If a direct current flows through the movable coil 66, the movable coil 66 is moved in parallel in the left and right on the plane of the figure by a force produced between the permanent magnet 64. As described above, the arm 57 is connected to the movable coil 66, resulting in pushing the side face of the optical apparatus.

Figure 10A:
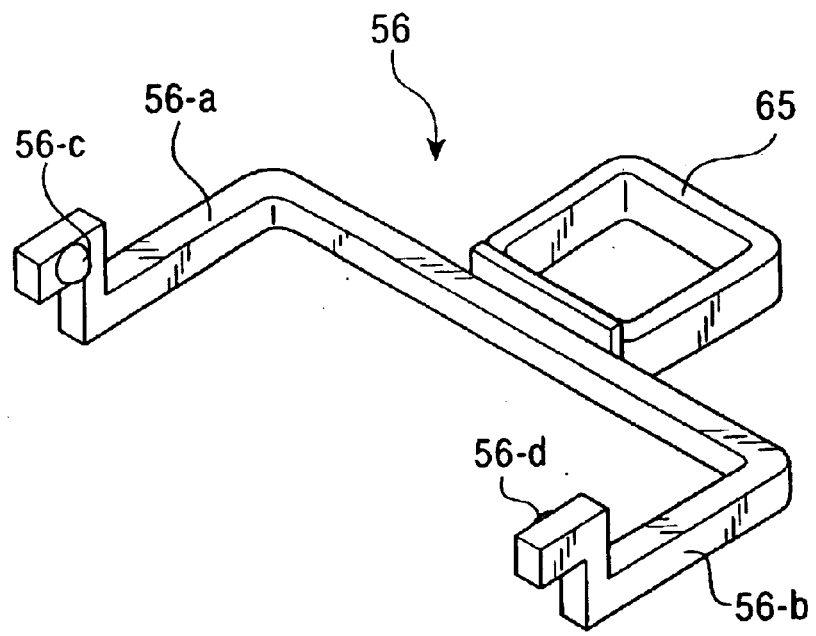
FIGS. 10A and 10B are enlarged views showing the structure of an arm.
Figure 10B:
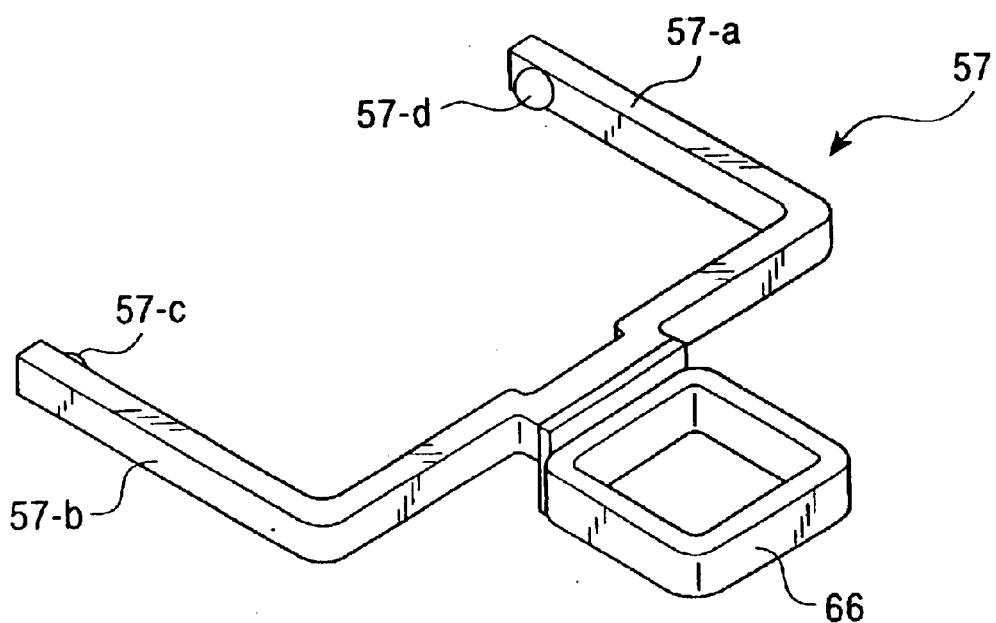
Figure 11:
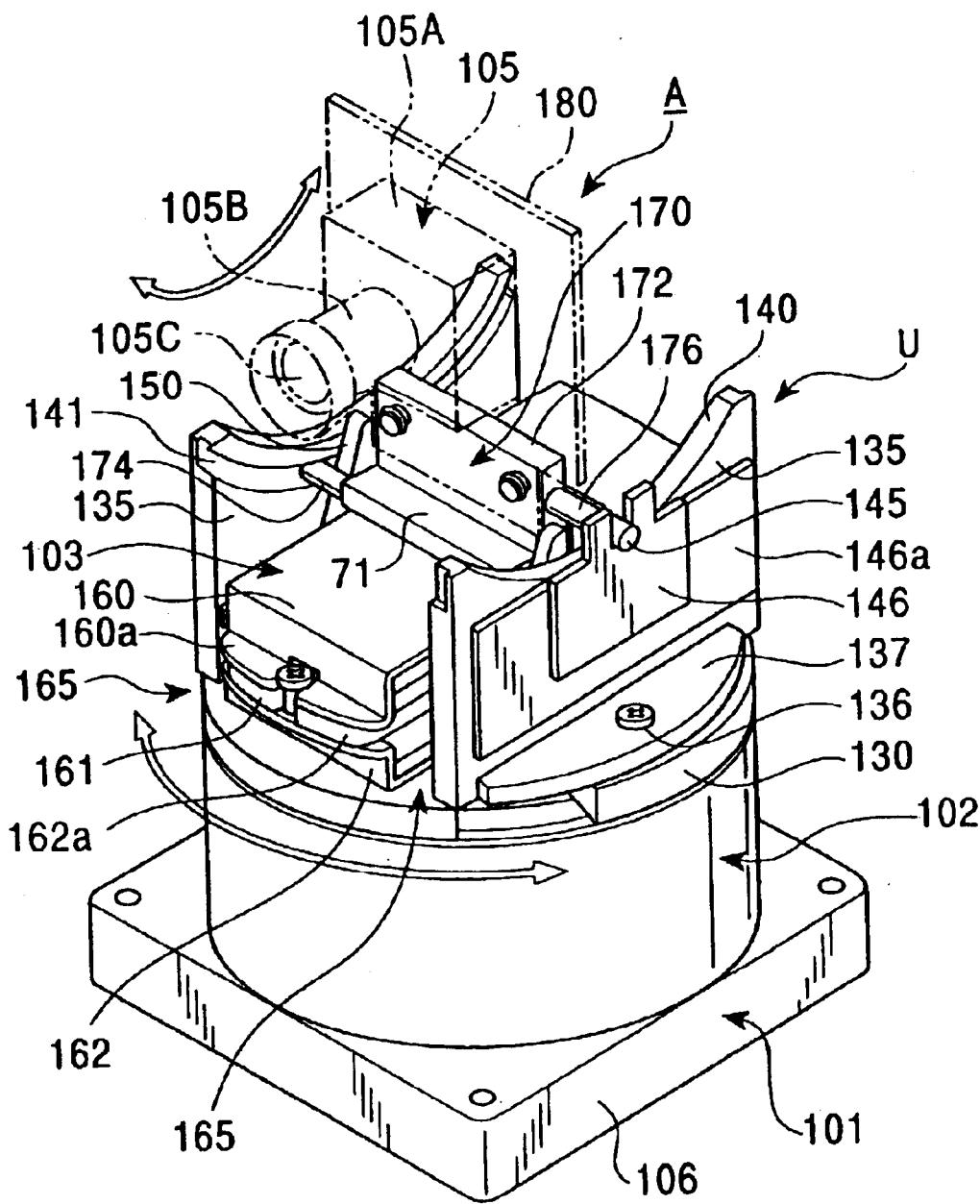
FIG. 11 is a perspective view of an optical apparatus according to a fourth embodiment of the present invention.
Figure 12:
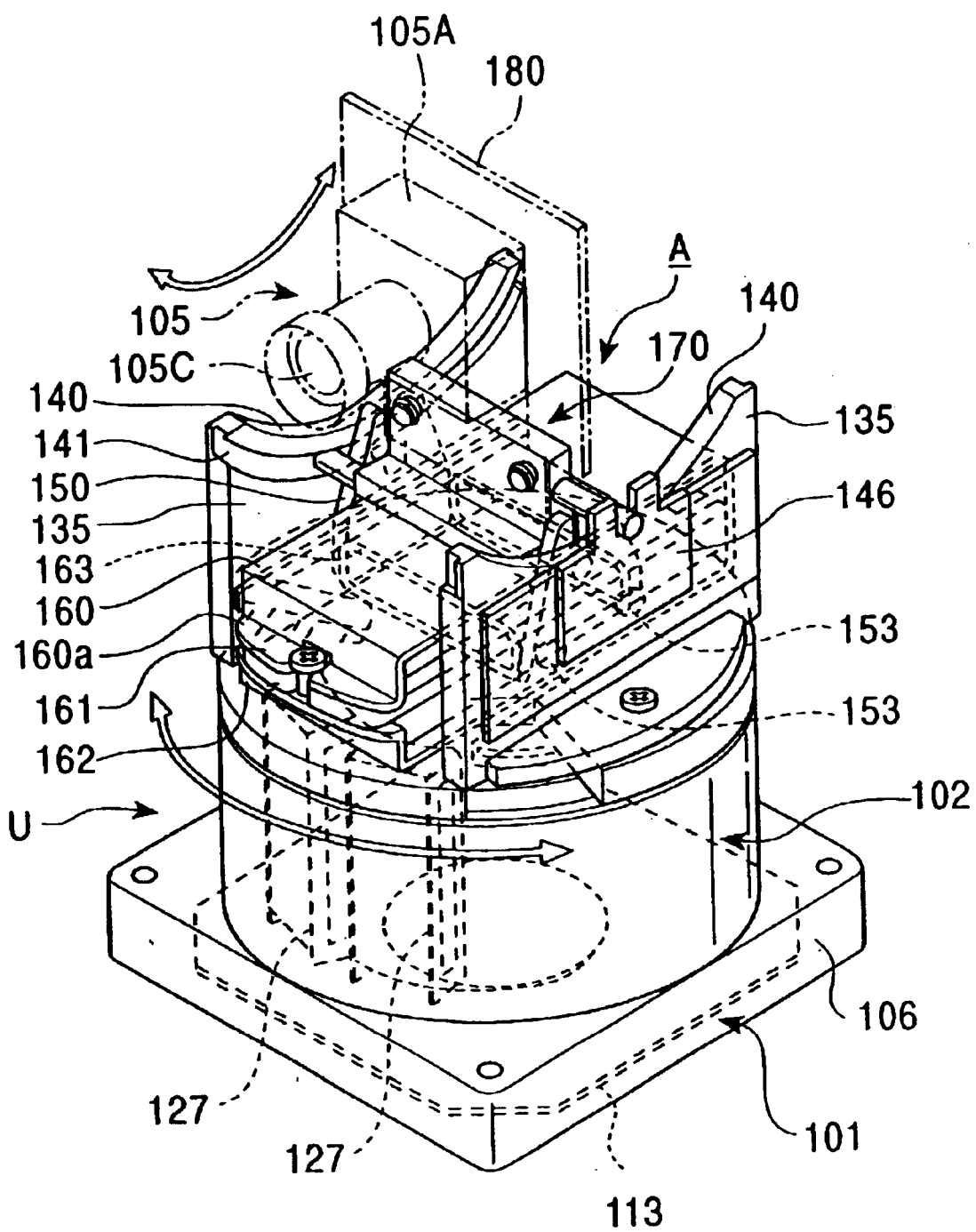
FIG. 12 is a partial perspective view of the optical apparatus according to the fourth embodiment.
Figure 13:
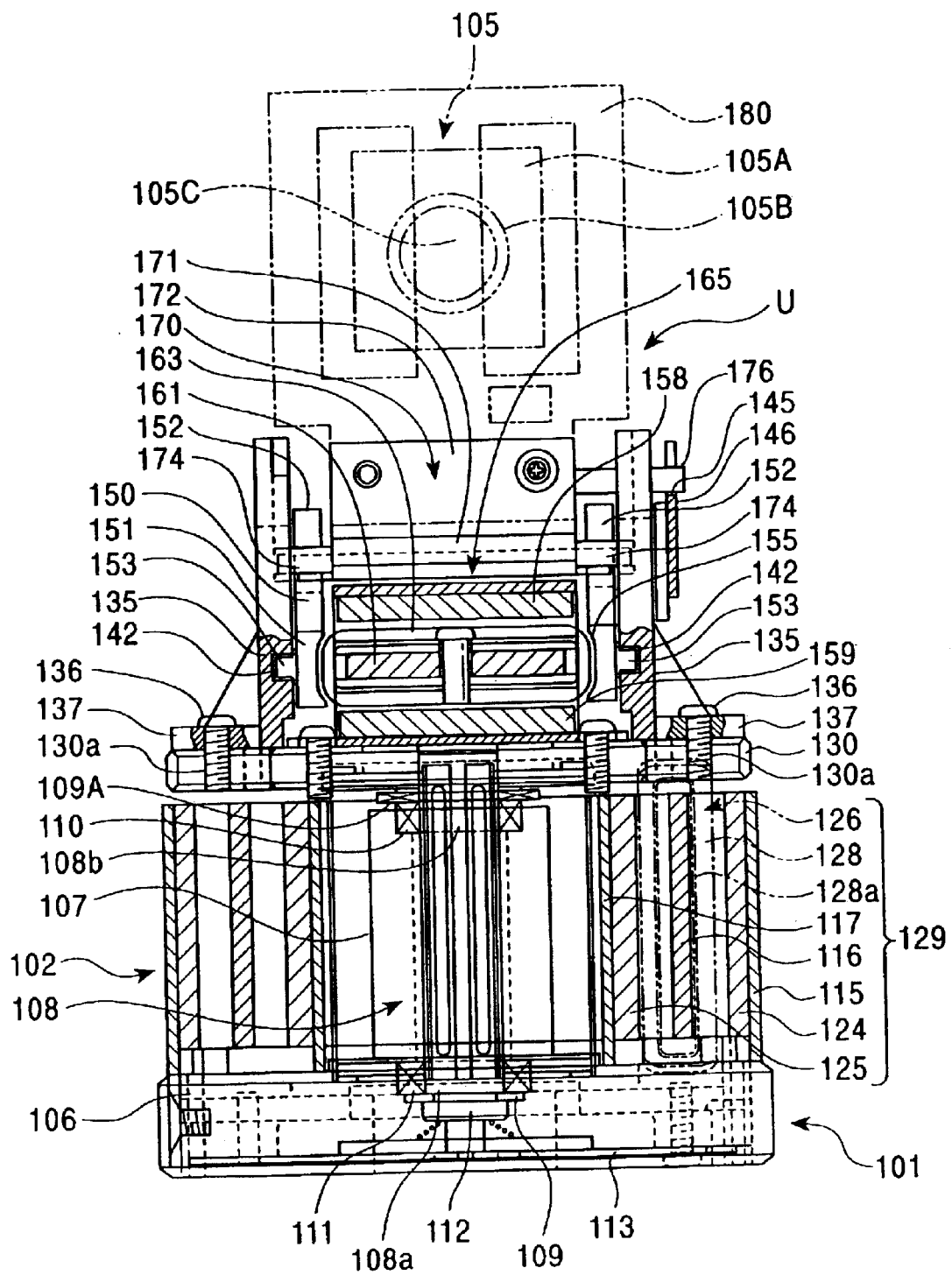
FIG. 13 is a front view of the optical apparatus according to the fourth embodiment, which is partially sectional and partially perspective.

FIGS. 10A and 10B are enlarged views showing structures of the arms 56 and 57 connected to the movable coils 65 and 66, respectively. FIG. 10A is a drawing of the arm 56 connected to the movable coil 65, and the arm 56 is forked into two arms 56-a and 56-b, in which end portions are raised vertically to have the projections 56-c and 56-dattached to the end portions.

On the other hand, FIG. 10B is a drawing of the arm 57 connected to the movable coil 66, and the arm 57 is forked into two arms 57-a and 57-b, in which end portions are raised vertically to have the projections 57-c and 57-dattached to the end portions.

The two arms 56 and 57 are combined perpendicularly to each other with the arm 57 placed above the arm 56, so that the projections 56-c and 56-d and the projections 57-c and 57-d can push the optical apparatus 61 at positions on substantially the same level.

As a permanent magnet used in the camera-platform mechanism according to the present invention, no specific limit is made; however, it is preferable to use a rare-earth permanent magnet containing neodymium (Nd).

The rare-earth permanent magnet containing neodymium having a composition of $Nd_7Fe_4B_2$ is a high-powered permanent magnet with excellent characteristics, in which a maximum magnetic flux (BHmax) reaches an extent of 40 MGOe. Therefore, if the VCM is constructed using the rare-earth permanent magnet containing neodymium, the VCM can be readily miniaturized. Moreover, a high-performance VCM is thereby obtained, which is sensitive even to a faint electric current.

Therefore, the camera-platform mechanism can also be miniaturized, and moreover can be reduced in cost because the material is comparatively inexpensive.

The optical apparatus according to the present invention has the camera-platform mechanism described above. In order to direct the optical apparatus incorporating such a camera-platform mechanism to a target, a position sensor using strain gages may be used, for example. That is, as shown in FIG. 7, strain gages are bonded on the torsion portions 52-a, 52-b, 52-c, and 52-d of the gimbal spring 52, so as to detect a strain of the torsion portion for detecting the displacement of the optical apparatus. The variation in the strain is converted into an electrical signal and is fed back to a control circuit of the driving circuit board 75 so as to drive the VCM, so that the optical apparatus is directed to a target. The control circuit in the driving circuit board 75 using ICs is also miniaturized and is offered in high-performance, enabling a precise and accurate direction to be established.

(Fourth Embodiment)

FIGS. 11 to 17 are drawings of an optical apparatus having a camera platform according to a fourth embodiment of the present invention. An optical apparatus A according to the embodiment comprises a rectangular-plate baseboard 101, a first externally cylindrical driving section 102 arranged on the baseboard 101 for horizontal rotation, a second driving section 103 arranged on the first driving section 102 for up-and-down swing, a camera platform U having rotating and converting means driven by the second driving section 103, and a camera body (optical instrument) 105 detachably mounted on the second driving section 103.

The baseboard 101 principally comprises a flat box-shaped baseboard body 106 and a cylindrical accommodating section 107 raised from the center of the baseboard body 106. Within the accommodating section 107, a support shaft 108 is arranged rotatably about the shaft with bearings 110 and 111 respectively accommodated on the upper and lower sides of the accommodating section 107 therebetween, in which the lower end portion 108a of the support shaft 108 is supported to the center of the baseboard body 106 against being loosen with a support member (E ring) 109, and the upper portion 108b is supported to the upper end of the accommodating section 107 with a support member (thrust plate) 109A.

The bottom side of the support shaft 108 is also provided with a rotation detector 112 such as a rotary encoder for detecting a horizontally rotational angle accommodated within the baseboard body 106. The under side of the rotation detector 112 is provided with a substrate 113 mounting an electrical circuit for controlling the rotation thereon, which is accommodated within the baseboard body 106.

In the structure described above, the rotational angle detection result from the rotation detector (angular sensor) 112 such as the rotary encoder for measuring a horizontally rotational angle of the support shaft 108 is input to the substrate 113 mounting a control circuit thereon as feedback information on the basis of this information, the rotational angle detection and control of the support shaft 108 can be performed by electronic controlling.

On the periphery of the accommodating section 107 and also above the baseboard body 106, an outer yoke 115, middle yoke 116, and inner yoke 117, which are substantially ring-shaped in plan view and made of a ferromagnetic material, are arranged in a substantially concentric circle. In more particular, each of the yokes 115, 116, and 117 is not a perfect ring-shape, which covers the 360° entire circumstance, but is substantially ring-shaped and covering about 300° (C-shape in plan view), (see FIGS. 13, 17, 20, and 22.). At one end of each of the yokes 115 and 117 in the circumferential direction, folded portions 115a and 117a are formed. The folded portion 115a of the outer yoke 115 and the folded portion 117a of the inner yoke 117 are overlapped on an end portion 116a of the yoke 116, which is located therebetween, so that the folded portion 115a of the outer yoke 115, the end portion 116a of the middle yoke 116, and the folded portion 117a of the inner yoke 117 are integrally connected to each other with connecting bolts (connecting members) 120 (see FIG. 17.), which penetrate therethrough.

At the other ends of the yokes 115, 116, and 117 in the circumferential direction, a rectangular shaped spacer 121 is inserted into between the end portions 115b and 116b of the yokes 115 and 116 (see FIG. 17.), while a rectangular shaped spacer 122 is inserted into between the end portions 116b and 117b of the yokes 116 and 117, so that the end portion 115b of the outer yoke 115, the spacer 121, the end portion 116b of the middle yoke 116, the spacer 122, and the end portion 117b of the inner yoke 117 are overlapped and integrally connected to each other with connecting bolts (connecting members) 123 (see FIG. 17.), which penetrate therethrough. This structure integrates the yokes 115, 116, and 117 in a substantially concentric circle.

Figure 20:
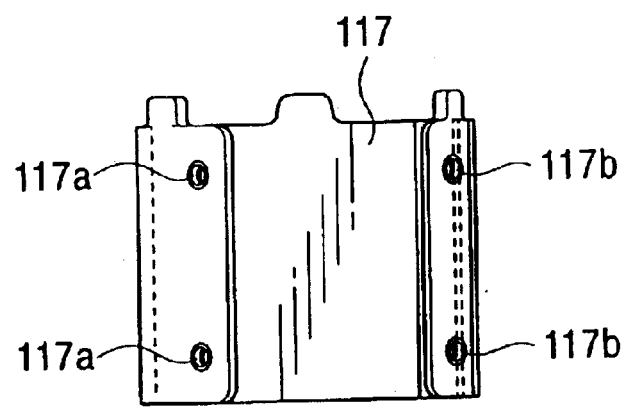
FIG. 20 is a side view of an inner yoke of the optical apparatus.
Figure 21:
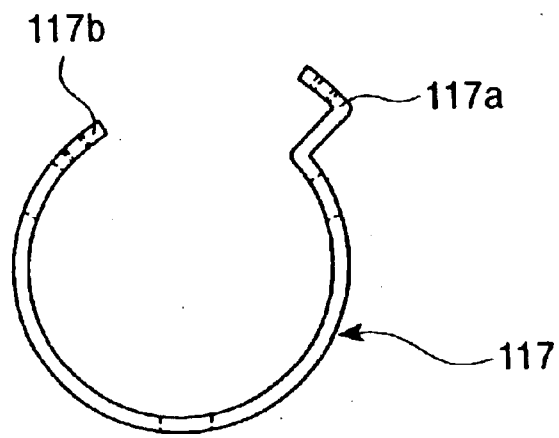
FIG. 21 is a plan view of the inner yoke of the optical apparatus.
Figure 22:
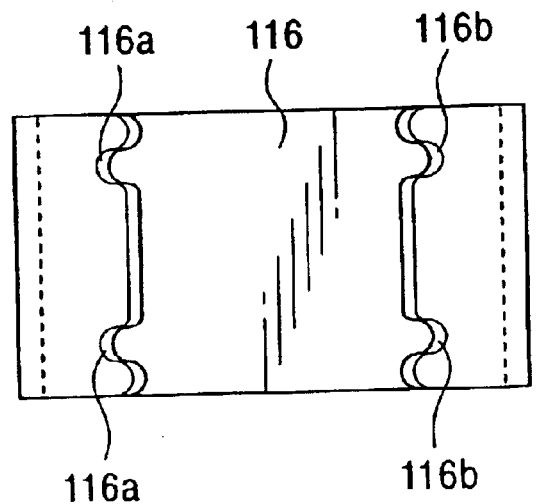
FIG. 22 is a side view of a middle yoke of the optical apparatus.

On the inner side of the outer yoke 115, a substantially annular (bracelet-shaped) outer magnetic member 124 abutting the inner side of the outer yoke 115 is arranged leaving a space to the middle yoke 116. On the outer side of the inner yoke 117, a substantially annular (bracelet-shaped) inner magnetic member 125 abutting the outer side of the inner yoke 117 is arranged leaving a space to the middle yoke 116. FIGS. 20 and 21 show the outer shape of the inner yoke 117 and FIG. 22 shows the outer shape of the middle yoke 116, in which on the upper and lower portions at ends of the inner yoke 117 in the circumferential direction, tapped holes 117a and 117b are formed for being screwed to the connecting bolts 120 and 123, and on the upper and lower portions at ends of the middle yoke 116 in the circumferential direction, holes 116a and 116b are formed for being inserted to the connecting bolts 120 and 123.

A long coil member 126 (see FIGS. 13 to 17.) is arranged so as to lie in a space between part of the outer magnetic member 124 and part of the inner magnetic member 125. The coil member 126 is constructed by connecting two coils 128 and 128 in parallel, the coil 128 being constructed by wiring around a flat long bobbin 127 shown in FIG. 17. Into a flat space 128a formed in each of the coils 128 connected in parallel, the middle yoke 116 is inserted, and the coils 128 and 128 are attached to the middle yoke 116 movably in the circumferential direction along the middle yoke 116 in a state of surrounding part of the middle yoke 116 with the coils 128 and 128.

That is, the pair of the coils 128 and 128 is movable and integral in the circumferential direction along the middle yoke 116. Since the coil member 126 is located between the outer magnetic member 124/the outer yoke 115 and the inner magnetic member 125/the inner yoke 117, the coil member 126 itself is moved in the circumferential direction along the middle yoke 116 by allowing an electric current to flow through these coils 128 and 128 so as to produce a magnetic field, thereby constructing a voice coil motor VCM 129 for horizontal rotation.

Figure 23:
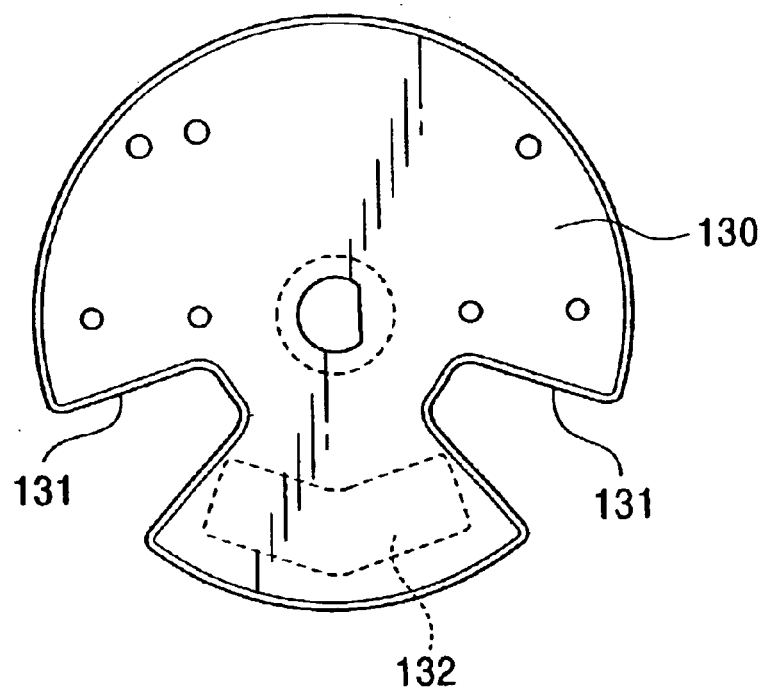
FIG. 23 is a plan view of a table of the optical apparatus.
Figure 24:
FIG. 24 is a front view of the table of the optical apparatus.
Figure 25:
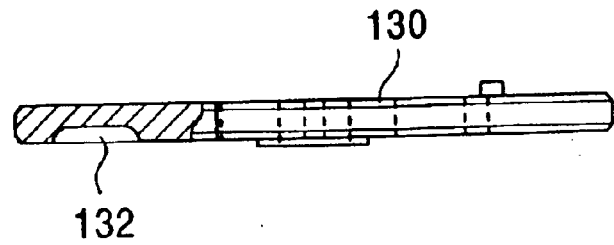
FIG. 25 is a sectional view of the table of the optical apparatus.

The support shaft 108 is rotatably supported with the upper end thereof protruded slightly higher than the upper end of the outer yoke 115. The upper end is provided with a disc-like table 130 attached thereto, which is rotatably supported about the support shaft 108. The external shape is shown in FIGS. 23 and 25, and the table 130 is provided with recesses 131 and 131 formed on the outer periphery thereof at an interval of 110° and concave grooves 132, which correspond to the width and length of the ends of the coils 128 and 128, formed at positions corresponding to rear faces of the recesses 131 and 131. Into the concave grooves 132, the upper ends of the coils 128 and 128 are inserted and bonded with bonding means such as an adhesive, so that the table 130 is rotatable in the circumferential direction of the middle yoke 116 together with the coils 128 and 128, i.e., being rotatable in the circumferential direction of the table 130.

As described above, the connecting bolts 120 and 123 are inserted into both ends of the middle yoke 116 in the circumferential direction, and end portions of the inner yoke 117 and the outer yoke 115 are overlapped, so that the rotatable angle of the coil member 126 is smaller than 360°. In more particular, the coil member 126 is rotatable along the middle yoke 116 until the coil member 126 abuts the folded portion of the end portion 115a of the outer yoke 115 closer in the end portion 115a of the outer yoke 115. Therefore, the table 130, which is rotated together with the coil member 126, is circumferentially rotatable by about 190° back and forth.

Figure 26:
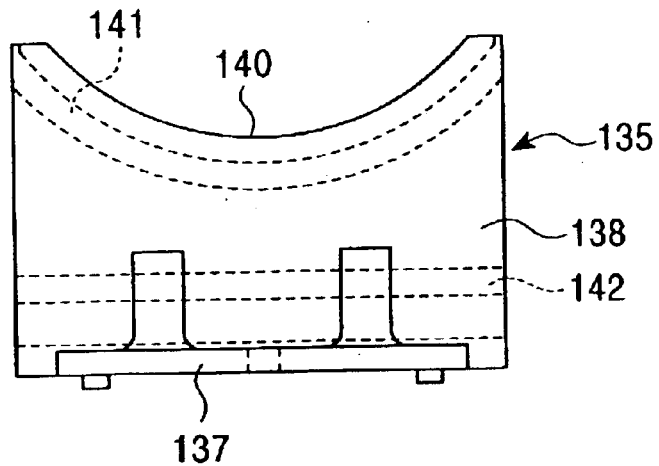
FIG. 26 is a right-side view of a guide board of the optical apparatus.
Figure 27:
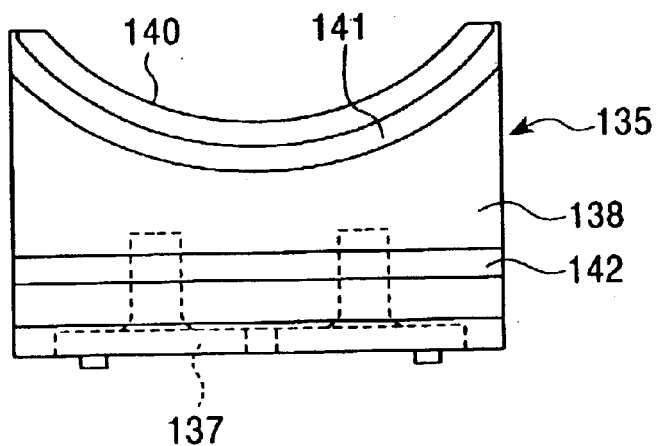
FIG. 27 is a left-side view of the guide board of the optical apparatus.
Figure 28:
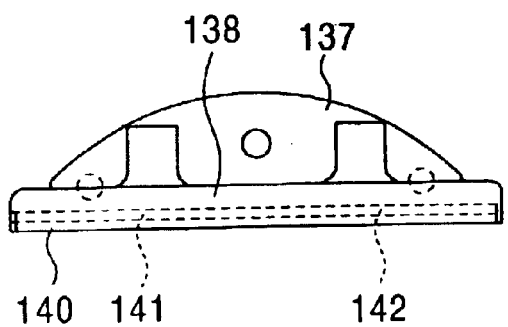
FIG. 28 is a plan view of the guide board of the optical apparatus.

On the top surface of the table 130, guide boards 135 and 135 are raised therefrom and fixed with plural bolts 136 in a state of opposing in parallel with each other. FIGS. 26 to 28 show the external shape of the guide board 135, which comprises a bottom plate 137 being circular arc in plan view and abutting the top surface of the table 130 and a support plate 138 extending perpendicularly to the bottom plate 137. The guide board 135 is fixed in a raised state with the bolt 136, which is penetrated through the center of the bottom plate 137 and screwed into a tapped hole 130a of the table 130.

Each of the support plates 138 and 138 is provided with a circular-arc concave curved-surface 140 formed at the upper end thereof and a circular-arc guide groove 141 formed at a position slightly lower than the curved-surface 140 and in parallel therewith. Furthermore, each of the support plates 138 and 138 is provided with a linear guide groove 142 formed nearly on the lower surface, where the support plates 138 and 138 oppose each other, in parallel with the surface of the table 130. As described above, in a state that the guide boards 135 and 135 are fixed on the surface of the table 130 and the support plates 138 and 138 oppose each other, the guide grooves 145 and 145 oppose in parallel with each other at the same height, and also the guide grooves 142 and 142 oppose in parallel with each other at the same height. A rectangular linear potentiometer (position sensor) 146 having a bearing 145 arranged in the upper center thereof is attached nearly on the external surface of one of the guide boards 135 so as to locate the bearing 145 in the vicinity of the external central bottom of the curved-surface 140.

Figure 29:
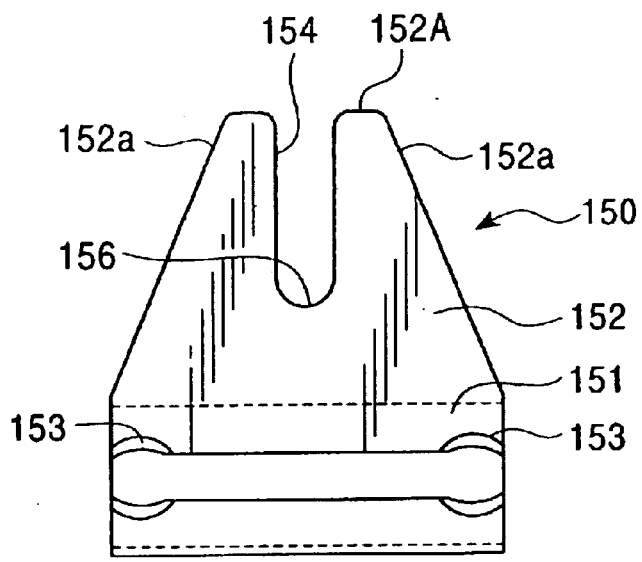
FIG. 29 is a side view of a holder member of the optical apparatus.
Figure 30:
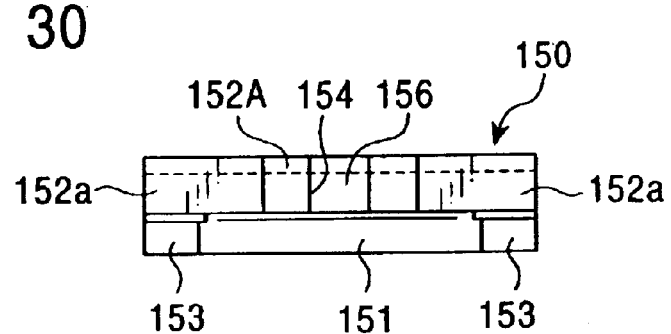
FIG. 30 is a plan view of the holder member of the optical apparatus.
Figure 31:
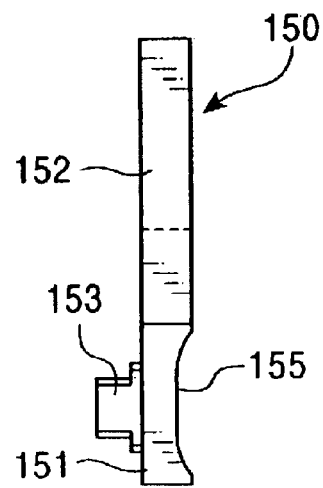
FIG. 31 is a front view of the holder member of the optical apparatus.

Then, on the internal surface of each of the guide boards 135, a holder member (moving coil holder) 150 shown in FIGS. 29 to 31 is mounted. The holder member 150, as shown in FIGS. 29 and 31, comprises a plate-like bottom section 151 and a support section 152 being substantially trapezoidal plate shaped in side view and formed in the upper part of the bottom section 151, wherein on one surface of the bottom section 151, two guide projections 152 are formed at the both ends of the bottom section 151 while a support recess 155 is formed in the opposite thereto. In the upper center of the support section 152, a slit 154 having a depth as long as about ⅔ of the support section 152 is formed. The bottom of the slit 154 is provided with a round-hole bearing 156 formed thereon while inclined surfaces (guides) 152a and 152a are formed in the upper part of the support section 152 so as to pinch the slit 154, and the upper part of the support section 152 is tapered so as to form an edge portion 152A.

Each guide projection 153 of the moving coil holder 150 is inserted into the linear guide-groove 142 formed in the lower part of the guide board 135 described above, and each support recess 155 is guided along the guide board 135 toward the center of the table 130. Between the holder members 150 and 150 respectively positioned inside the right and left guide boards 135 and 135, there is provided a voice coil motor (VCM) 165 for linear (reciprocating) movement having an upper yoke 160, center yoke 161, lower yoke 162, and a coil member 163, which will be described later.

The upper yoke 160 is made of a ferromagnetic material such as a rectangular steel plate with a width slightly smaller than the space between the holder members 150 and 150; the center yoke 161 is made of a ferromagnetic material such as a rectangular steel plate with the same width as that of the upper yoke 160; and similarly, the lower yoke 162 is also made of a ferromagnetic material such as a rectangular steel plate with the same width as that of the upper yoke 160. Folded portions 160a and 162a, which are respectively formed at both ends in the longitudinal direction of the upper yoke 160 and the lower yoke 162, are opposed to each other so as to pinch the end portion of the center yoke 161 therebetween. These folded portions 160a and 162a, and the end portion of the center yoke 161, which is pinched by the folded portions 160a and 162a, are integrally connected together with connecting bolts (connecting gadgets) 166, which are penetrated through ends of these, and furthermore, the lower yoke 162 is fixed on the table 130 at the center with a bolt. On the bottom surface of the upper yoke 160, a plate-like upper magnetic member 158 is abutted and fixed while on the top surface of the lower yoke 162, a plate-like lower magnetic member 159 is abutted and fixed.

Into the center yoke 161, a flat coil member 163, which is located in the width direction of the center yoke 161 and surrounds part of the center yoke 161, is inserted. The coil member 163 is arranged between the upper magnetic member 158 and the lower magnetic member 159 so as to be movable back and forth in the longitudinal direction of the center yoke 161. The coil member 163 is constructed by winding around a flat hollow bobbing to be hollow-centered.

The coil member 163 is arranged along the width direction of the center yoke 161, and both ends in the longitudinal direction of the coil member 163 are slightly protruded outside the both ends in the width direction of the center yoke 161. The both protruded ends are pinched and supported by the support recesses 155 of the holder members 150 and 150 so that when the coil member 163 is moved in the longitudinal direction of the center yoke 161, the holder members 150 and 150 also move together with the coil member 163. In addition, the holder members 150 and 150 are constructed so as to smoothly move along the guide groove 142 in a state that the guide projections 153 and 153 formed on the holder members are inserted into the guide grooves 142 of the guide boards 135 and 135.

Figure 32:
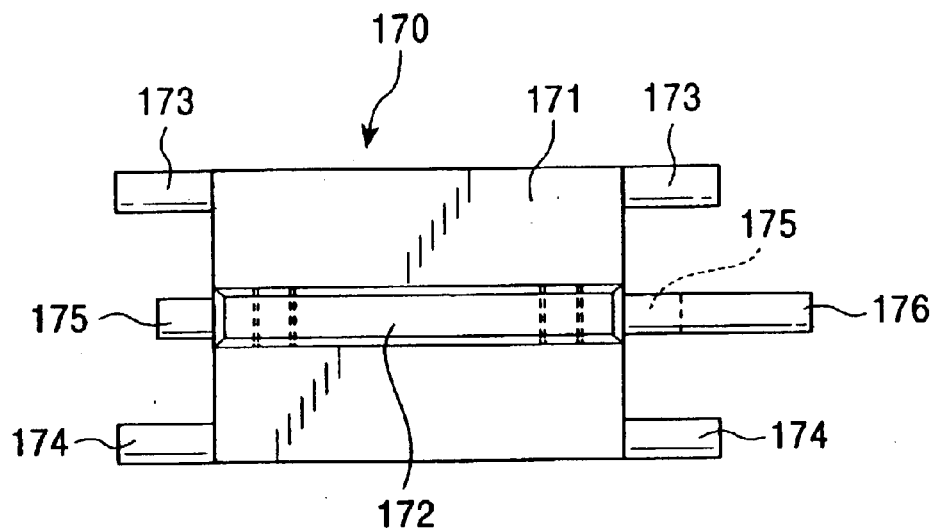
FIG. 32 is a plan view of a movable base of the optical apparatus.
Figure 33:
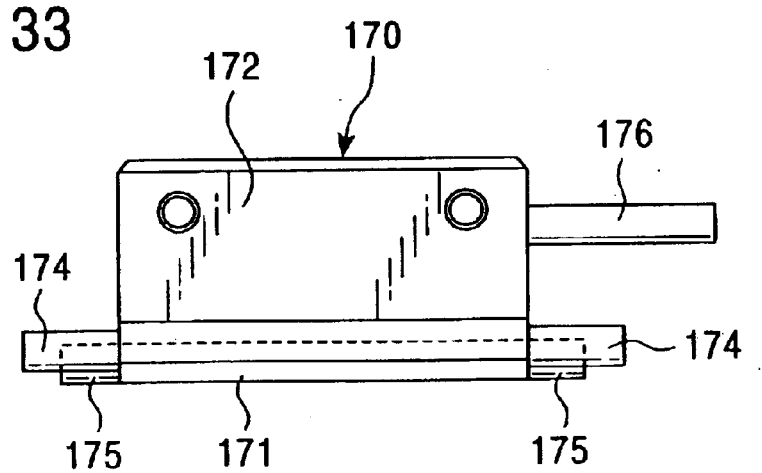
FIG. 33 is a front view of the movable base of the optical apparatus.
Figure 34:
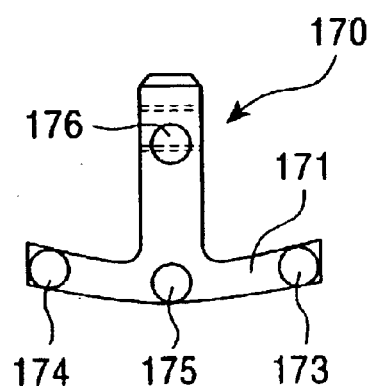
FIG. 34 is a side view of the movable base of the optical apparatus.
Figure 35:
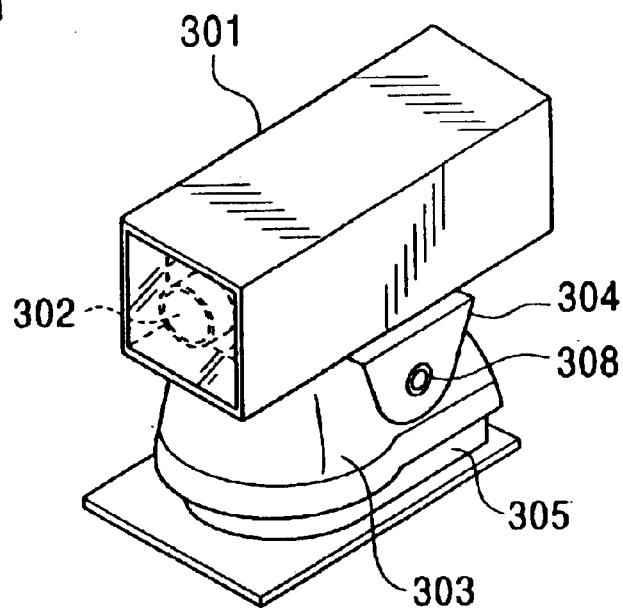
FIG. 35 is a perspective view of an example of a conventional camera turntable.
Figure 36:
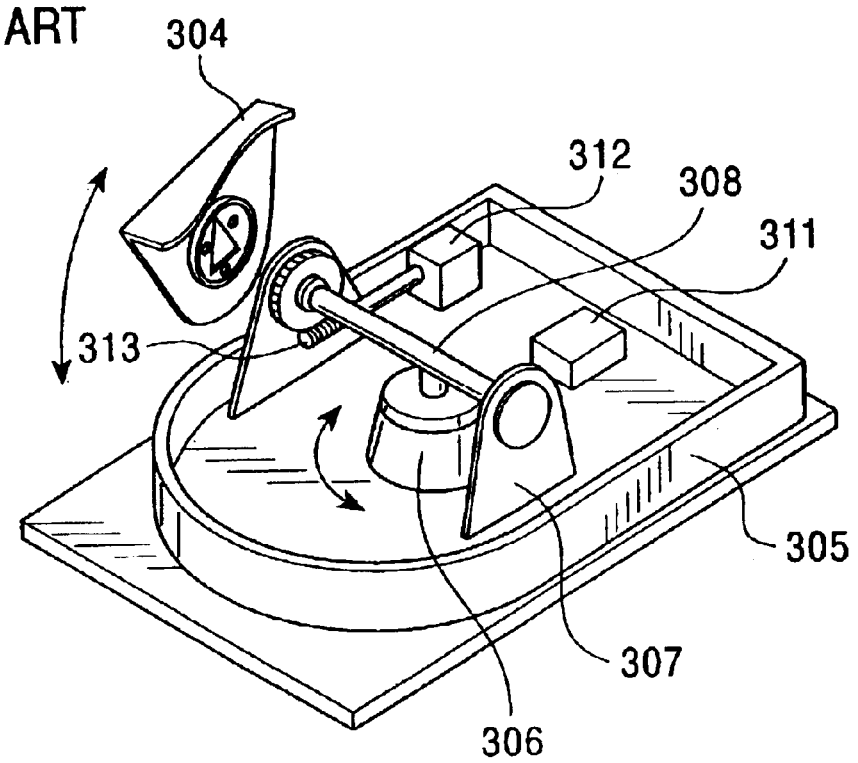
FIG. 36 is an exploded perspective view of the example of a conventional camera turntable.

Between the upper portions of the holder members 150 and 150, a movable base 170, shown in FIGS. 32 to 34 with the external shape, is inserted. The movable base 170 comprises a curved base plate 171, in which both sides in the width direction of a rectangular plate are curved so as to approach each other starting from the center thereof, and a support plate 172 raised from the center of the top surface of the base plate 171 in the width direction, so as to be substantially inverted T-shaped in side view.

Both ends of one end in the width direction of the base plate 171 are provided with support pins 173 and 173 formed and protruded so as to abut along the longitudinal direction of the base plate 171, while both ends of the other end in the width direction of the movable base 170 are provided with support pins 174 and 174 formed and protruded so as to abut along the longitudinal direction of the base plate 171. That is, at four corners of the base plate 171, four of the support pins 173 and 174 in total are respectively formed. Furthermore, both ends in the width direction of the center of the base plate 171 are provided with guide pins 175 and 175 formed so as to respectively extend toward both ends of the support plate 172. These guide pins 175 and 175 are formed to be slightly shorter than the support pins 174 and 174. Furthermore, one upper side of the support plate 172 is provided with a support pin 176 protruded in parallel with the support pins 173 and 174, and the support pin 176 is formed to be longer than the support pins 173 and 174. Therefore, as shown in FIG. 34, when the movable base 170 is viewed from one side of the base plate 171, on the bottom side of the movable base 170, the support pin 174, the guide pin 175, and the support pin 173 are arranged from the left in that order on the bottom of the movable base 170. On the upper side of the central guide pin 175, the support pin 176 is arranged.

In the movable base 170 constructed as described above, the longest support pin 176 formed on the movable base 170 is journaled to the bearings 145 of the linear potentiometer 146 arranged on the external surface of the one guide board 135 described above; the edge portion 152A of the one holder member 150 described above is inserted between the support pins 173 and 174 of the movable base 170; the edge portion 152A of the other holder member 150 described above is inserted between the other support pins 173 and 174 of the base plate 171; the support pins 173 and 174 are inserted into the circular-arc guide groove 141 of the one guide board 135 described above; the other support pins 173 and 174 are inserted into the circular-arc guide groove 141 of the other guide board 135 described above; the one guide pin 175 of the movable base 170 is inserted into the slit 154 of the one holder member 150; and in a state that the other guide pin 175 is inserted into the slit 154 of the other holder member 150, the other guide pin 175 is suspended between the guide boards 135 and 135. In addition, in a state that the guide pin 175 is inserted into the bearing 156 of the holder member 150 and the edge portions 152A and 152A of the holder members 150 are inserted between the support pins 173 and 174, the inclined surfaces 152a and 152a of the holder members 150 are arranged leaving small spaces to the support pins 173 and 174, respectively (see FIG. 14 or FIG. 15.).

According to the structure described above, if the holder member 150 described above moves back and forth along the linear guide groove 142, because the inner wall of the slit 154 of the holder member 150 pushes the guide pin 175 so as to engage it, the movable base 170 can swing tracing a circular-arc trajectory by allowing the support pins 173, 173, 174, and 174 to abut along the circular-arc guide groove 141, so as to form rotation converting means by the guide grooves 135 and 135, the holder members 150 and 150, and the movable base 170. That is, the guide pin 175 is moved by the linkage with the holder member.

That is, the upper yoke 160, the center yoke 161, the lower yoke 162, the upper magnet member 158, the lower magnet member 159, and the coil member 163 constitute the voice coil motor 165 for linear driving, and by means of the voice coil motor 165, the movable base 170 can swing up-and-down.

The linear potentiometer (position sensor) 146 detects the position of the coil member 163 of the voice coil motor 165 so as to determine the rotational angle of the movable base 170. According to the structure described above, the positional result detected by the linear potentiometer 146 for detecting the position of the coil member 163 of the voice coil motor 165 is input to the control circuit on the substrate 113 as feedback information, and based on the feedback information, the rotational angle of the swinging up-and-down of the movable base 170 can be detected and controlled by electronic control.

To the support plate 172 of the movable base 170, an attaching plate 180 is detachably fixed with bolts penetrating the support plate 172 and the attaching plate 180, and to the attaching plate 180, the camera body (optical instrument) 105 such as a compact CCD camera is fixed. The camera body 105 comprises a box-shaped body 105A and a lens barrel 105B disposed in the center of the body 105A, and the lens barrel 105B comprises a lens group 105C accommodated therewithin.

The control circuit of the above-described substrate 113, accommodated within the baseboard 101 for mounting control circuits, is connected to the coil 128 of the voice coil motor 129 in the first driving section 102 via flexible wiring (not shown), so that the coil 128 can be rotated to a target position along the middle yoke 116 by allowing a required electric current to flow through the coil 128 from the control circuit of the substrate 113, while the control circuit of the substrate 113 for mounting control circuits is connected to the coil member 163 of the voice coil motor 129 in the second driving section 103 via flexible wiring (not shown), so that the coil member 163 can be linearly moved back-and-forth to a target position along the middle yoke 116 by allowing a desired electric current to flow through the coil member 163 from the control circuit of the substrate 113.

Next, the operation of the optical apparatus A constructed as above will be described.

When taking a picture using the camera body 105 provided in the optical apparatus A, the direction of the camera body 105 can be changed up-and-down and right-and-left.

First, in the horizontally placed optical apparatus A, in order to rotate the camera body 105 right-and-left, a predetermined electric current is applied to the coils 128 and 128 of the voice coil motor 129 for horizontal rotation from the substrate 113. In the voice coil motor 129, the coils 128 and 128 respond to the applied current rapidly so as to move along the middle yoke 116 in the circumferential direction of the middle yoke 116, so that the table 130 is rotated by a required angle together with the movement of the coils 128 and 128, thereby directing the camera body 105 rapidly to a desired horizontal direction. That is, in the voice coil motor 129, the relative rotational direction and rotation amount between the magnets 124/125 and the coils 128/128 can be changed corresponding to the current direction and current amount flowing through the coils 128 and 128.

Since the coil member 126 in the voice coil motor 129 is freely movable along the middle yoke 116, even when a user applies a force to the table 130 manually so as to rotate the table 130, the table 130 can move freely within the movable range of the coil member 126. Therefore, even when a user applies a force abruptly to the table 130, any load and damage cannot be applied to the mechanism of the voice coil motor 129. Whereas in the conventional device with a rotation driving mechanism using a gear and motor, when a user applies a force abruptly to the rotation driving mechanism, the gear or motor may be damaged. According to the embodiment, the rotational mechanism cannot be damaged.

Next, in order to swing the camera body 105 up-and-down, an electric current is applied to the coil 163 of the voice coil motor 163 in the second driving section 103 for swinging from the substrate 113. Then, the coil 163 moves along the middle yoke 116 in the longitudinal direction of the middle yoke 116, so that the holder members 150 and 150 move horizontally along the guide grooves 142 and 142, and the guide pins 175 and 175 are pushed by the inner wall of the slit 154 of the holder members 150 and 150, so that the movable base 170 is moved along the arc guide groove 141, thereby inclining the movable base 170 up-and-down and swinging the camera body 105 up-and-down.

Figure 14:
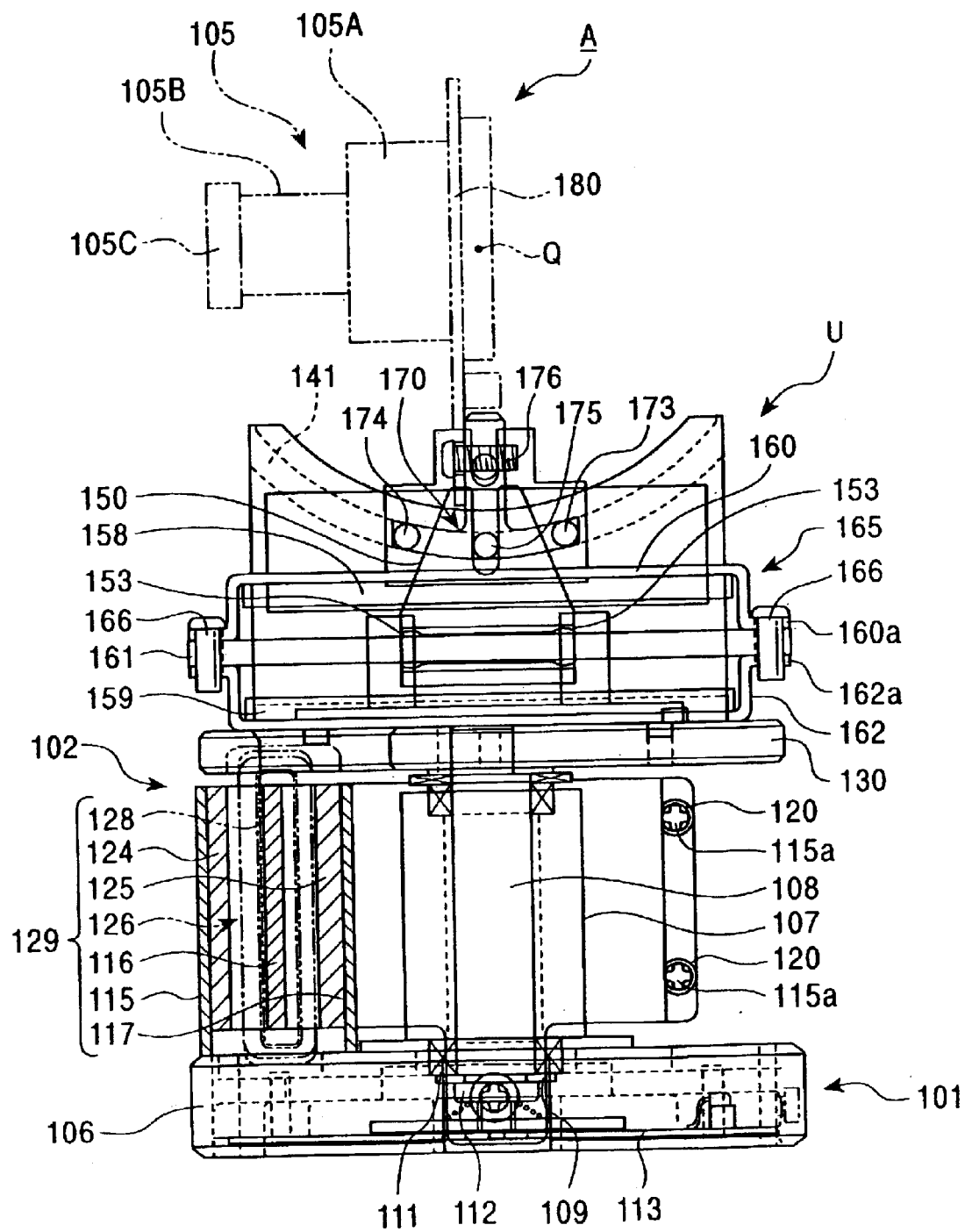
FIG. 14 is a right-side view of the optical apparatus according to the fourth embodiment, which is partially sectional and partially perspective.
Figure 15:
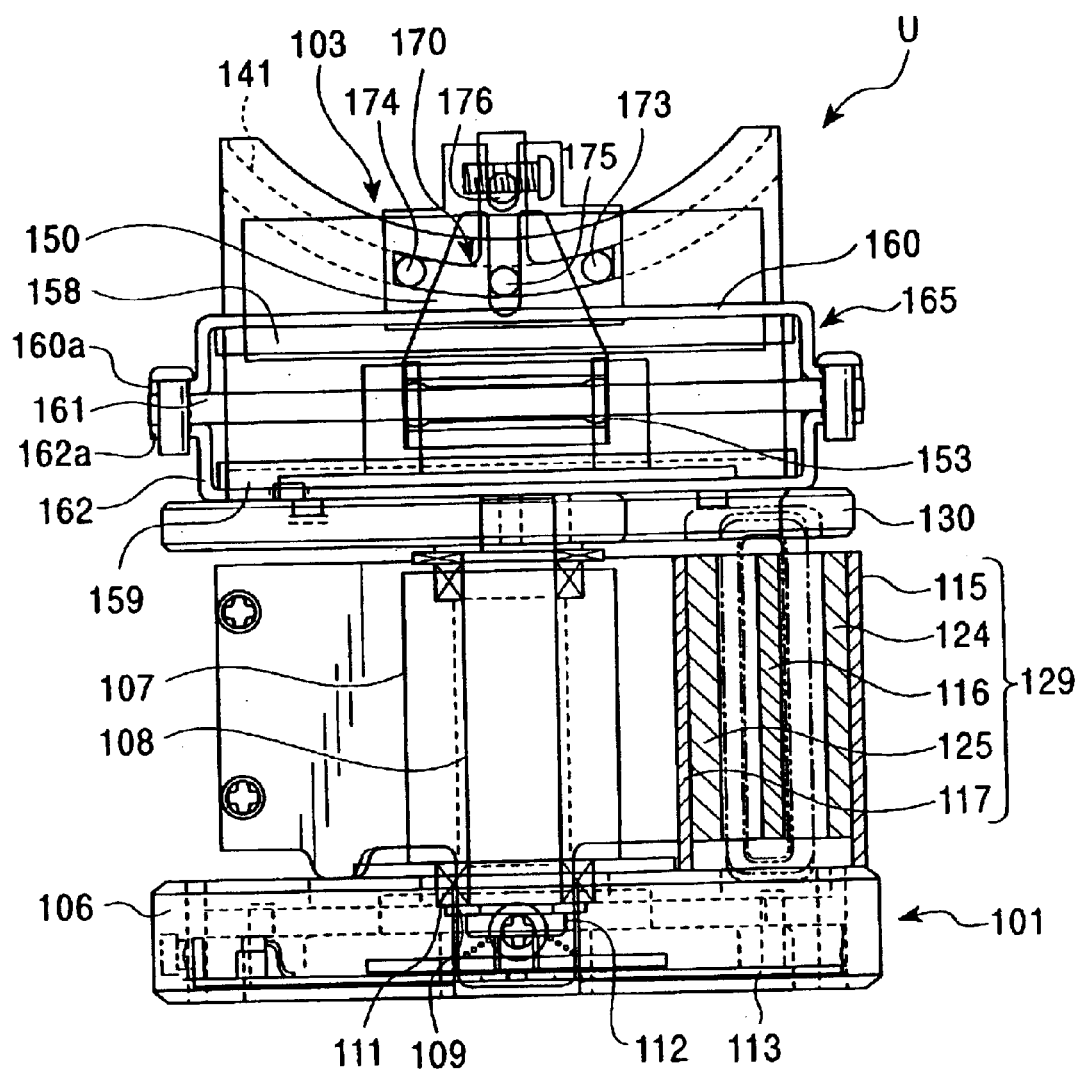
FIG. 15 is a left-side view of the optical apparatus according to the fourth embodiment, which is partially sectional and partially perspective.
Figure 16:
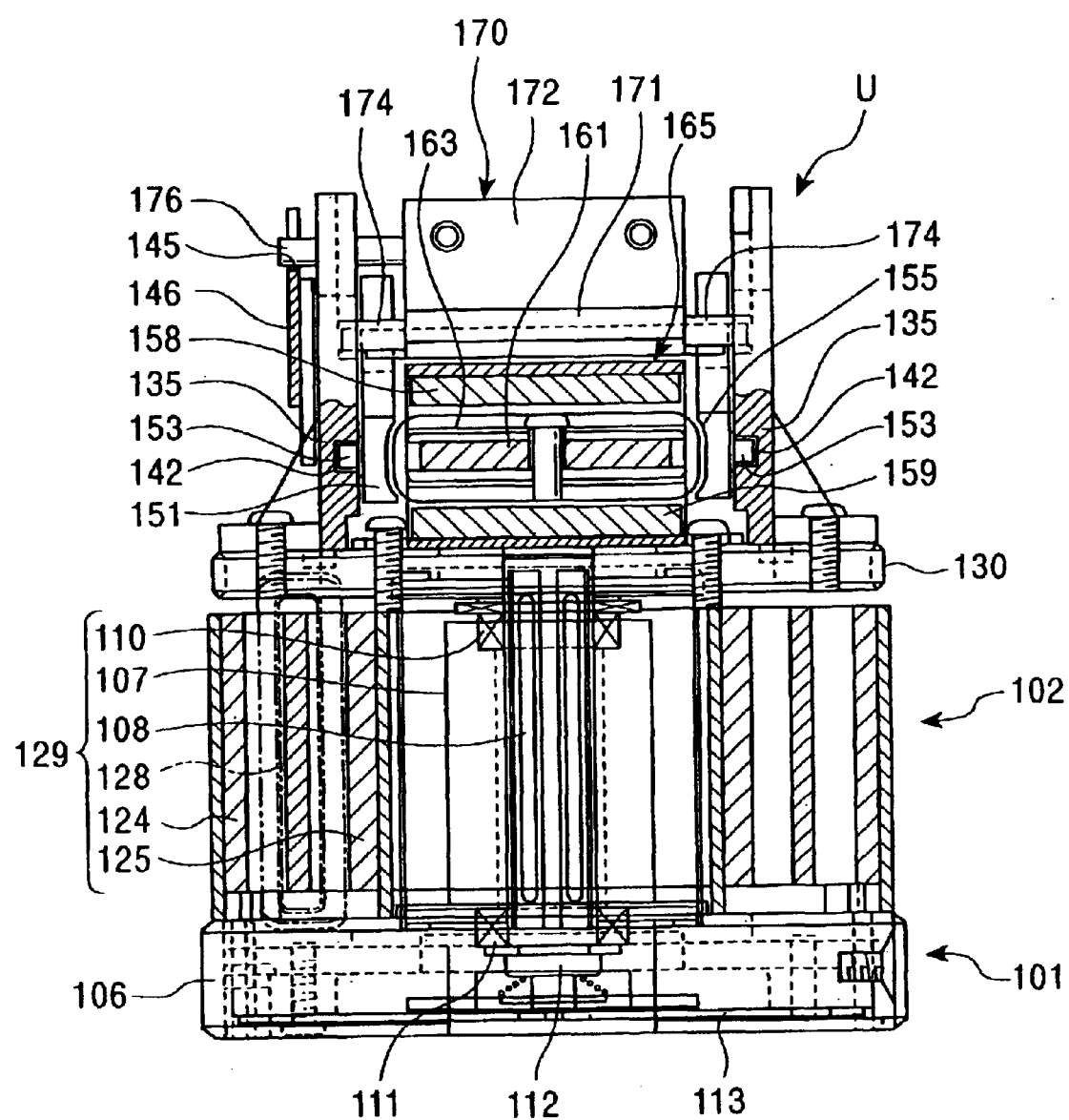
FIG. 16 is a rear view of the optical apparatus according to the fourth embodiment, which is partially sectional and partially perspective.
Figure 17:
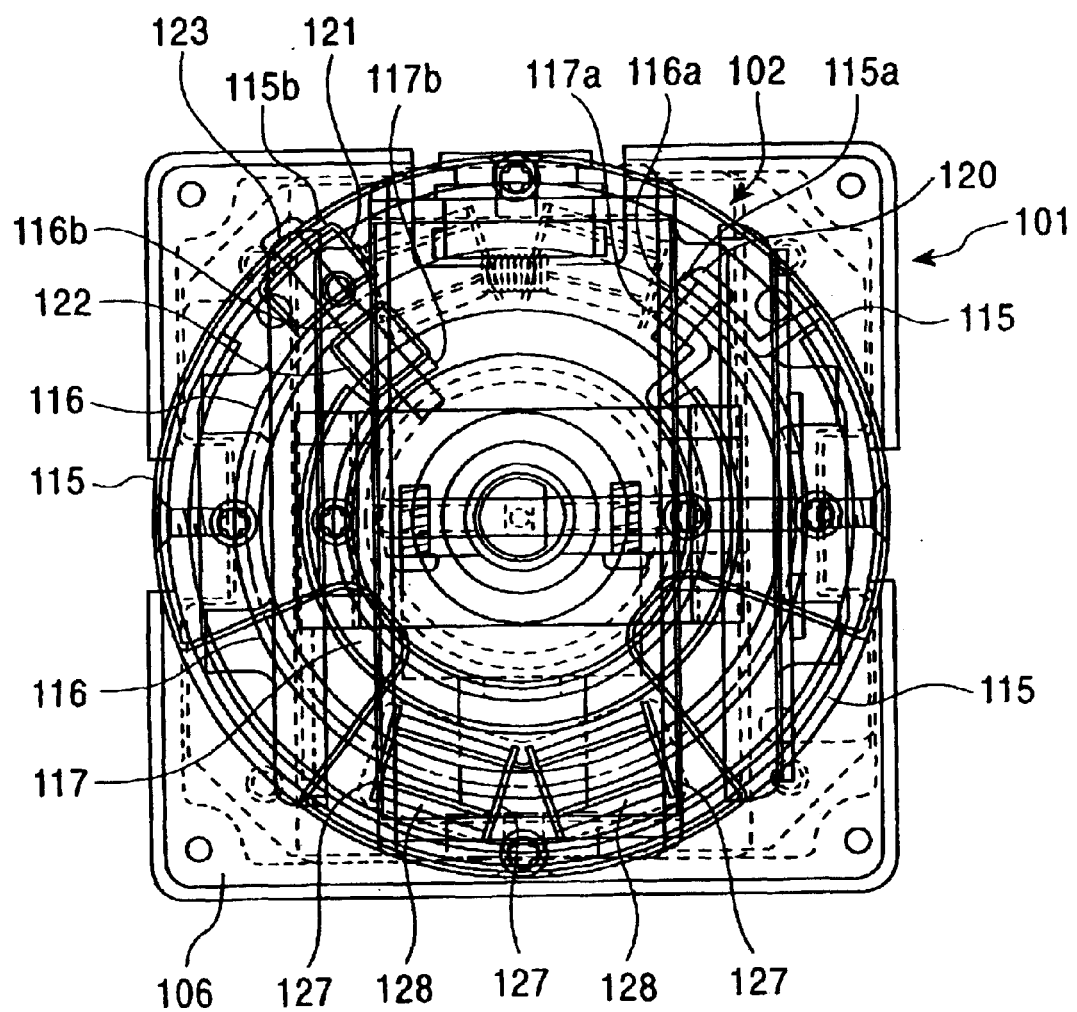
FIG. 17 is a plan view of the optical apparatus according to the fourth embodiment, which is partially perspective.
Figure 18:
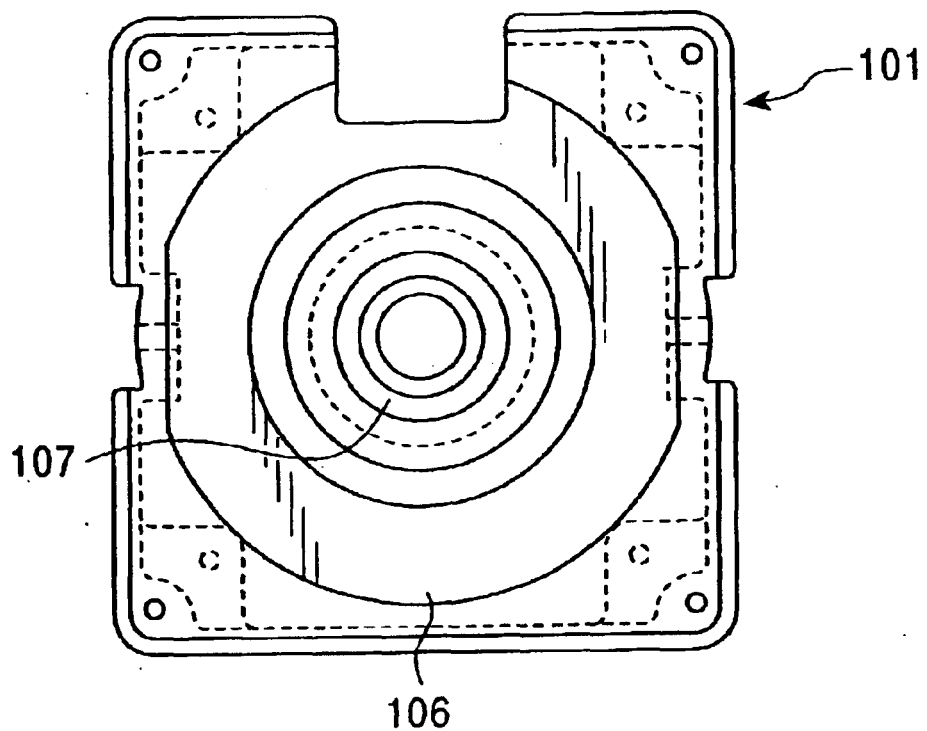
FIG. 18 is a plan view of a baseboard of the optical apparatus.
Figure 19:
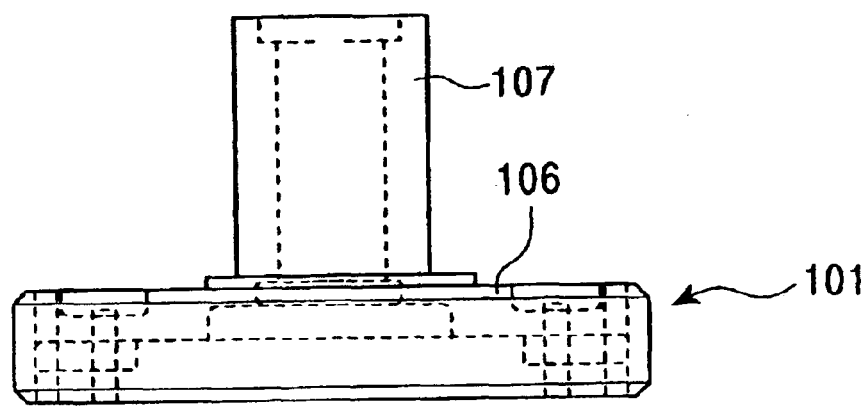
FIG. 19 is a side view of the baseboard of the optical apparatus.

During the up-and-down swinging of the camera body 105, since the movable base 170 supporting the camera body 105 moves along the arc guide groove 141 tracing an arc trajectory, the rotational axis is located outside the second driving section, for example, in the vicinity of the lens group 105 of the optical instrument 105 (specifically, in FIG. 14, the position of the virtual center of the arc guide groove 141 is a position Q close to the attaching plate 180 in the center of the body 105A of the camera body 105.). Therefore, when the camera body 105 is swung up-and-down in FIG. 14, the camera body 105 swings about the position Q as a center, the space captured by the camera body 105 during the swinging is reduced. That is, when the camera body 105 is supported by a simple one rotation shaft so as to swing thereabout, for example, the shaft is located close to the bottom of the attaching plate 180, so that the camera body 105 swings about the position close to the bottom of the attaching plate 180, increasing the captured space larger than above. Therefore, rather in the case where the movable base 170 moving along the arc guide groove 141 is provided, the rotational space captured by the camera body 105 is reduced so as to enable the optical instrument 105 to swing with a minimum space, resulting in miniaturizing the camera platform.

Since the coil 163 in the voice coil motor 165 is freely movable along the middle yoke 116, even when a user applies a force up-and-down abruptly to the camera body 105, the movable base 170, the holder members 150 and 150, and the coil member 163 can move freely, so that any load cannot be applied to the mechanism of the voice coil motor 165. Therefore, even when the camera body 105 is rotated manually, any load or damage cannot be applied to the mechanism of the voice coil motor 165. Whereas in the conventional device with a rotation driving mechanism using a gear and motor, when a user applies a force to the rotation driving mechanism, the gear or motor may be damaged. According to the embodiment, the rotational mechanism cannot be damaged.

Next, the driving parts for rotating and swinging the camera body 105 right-and-left and up-and-down are the voice coil motors 129 and 165, so that there are advantages of small operating noise, which is the original feature of the voice coil motors 129 and 165, rapid response, and positioning with a high accuracy.

Furthermore, the optical apparatus A according to the embodiment is provided with the rotation detector (angular sensor) 112 such as the rotary encoder for measuring the rotational angle of the table 130, so that the detected result of the rotational angle is input to the substrate 113 mounting a control circuit thereon from the rotation detector 112 as feedback information. On the basis of this information, the rotational angle control of the table 130 can be performed by electronic controlling. Also, the detected result of the position of the coil 163 of the voice coil motor 165 for linear drive can be input to the substrate 113 mounting a control circuit thereon as feedback information. On the basis of this information, the rotational angel control of the movable base 170, i.e., the up-and-down swinging angle control of the optical instrument, can be performed by electronic controlling.

According to the embodiment, as the optical instrument 105, the camera body 105 such as a CCD camera is mounted; alternatively, when other optical instruments are used, the same effects of horizontal rotation and swinging are of course shown. For example, as the optical instrument 105, if a laser emission instrument is mounted, a compact laser projector capable of scanning at high speed can be obtained. Moreover, as the optical instrument 105, an illuminator, optical fiber, mirror, and half mirror may be of course mounted.

What is claimed is:

1. A turntable device for changing a direction of an optical apparatus comprising:

a base;

a horizontally rotatable table being rotatable right-and-left and disposed on the base;

supports disposed on the horizontally rotatable table;

an up-and-down swinging shaft to be connected to the optical apparatus through the supports for supporting the up-and-down swinging shaft;

horizontally rotating means arranged on the base for rotating the horizontally rotatable table right-and-left so as to rotate the optical apparatus right-and-left; and up-and-down swinging means arranged on the horizontally rotatable table for swinging the optical apparatus up-and-down about the up-and-down swinging shaft, wherein the optical apparatus can be directed up-and-down and right-and-left.

2. A turntable device according to claim 1, wherein the horizontally rotating means comprises a swinging voice coil motor (VCM), and a movable piece connected to a movable coil of the swinging VCM is rotated right-and-left.

3. A turntable device according to claim 1, wherein the horizontally rotatable table is rotated right-and-left following the rotation of a movable piece of the horizontally rotating means.

4. A turntable device according to claim 1, wherein the up-and-down swinging means comprises a direct-acting VCM, and wherein reciprocating movement of a movable piece connected to a movable coil of the direct-acting VCM is transmitted to the up-and-down swinging shaft via an arm so as to swing the up-and-down swinging shaft up-and-down following reciprocating movement of the movable coil of the direct-acting VCM.

5. A turntable device according to claim 1, wherein a rare-earth permanent magnet containing neodymium is used for a VCM.

6. An optical apparatus comprising a turntable device according to claim 1.

7. An apparatus according to claim 6, further comprising a positional detection sensor for detecting displacement of the optical apparatus.

8. An apparatus according to claim 6, further comprising a driving circuit board for controlling a VCM.

* * * * *